United States Patent

Fletcher et al.

[15] 3,686,639

[45] Aug. 22, 1972

[54] DIGITAL COMPUTER-INDUSTRIAL CONTROLLER SYSTEM AND APPARATUS

[72] Inventors: William E. Fletcher, Woburn; Leon B. Rosseau, Sherborn, both of Mass.

[73] Assignee: Modicon Corporation, Bedford, Mass.

[22] Filed: Dec. 11, 1969

[21] Appl. No.: 884,224

[52] U.S. Cl............................................340/172.5
[51] Int. Cl...............................................G06f 3/02
[58] Field of Search............340/172.5, 345, 347, 365

[56] References Cited

UNITED STATES PATENTS

| | | | |
|---|---|---|---|
| 3,226,684 | 12/1965 | Cox | 340/172.5 |
| 3,374,465 | 3/1968 | Richmond et al. | 340/172.5 |
| 3,406,379 | 10/1968 | Palevsky et al. | 340/172.5 |
| 3,495,220 | 2/1970 | Lawson et al. | 340/172.5 |
| 3,500,328 | 3/1970 | Wallis | 340/172.5 |
| 3,509,539 | 4/1970 | Fichten et al. | 340/172.5 |
| 3,324,458 | 6/1967 | MacArthur | 340/172.5 |
| 3,380,031 | 4/1968 | Clayton et al. | 340/172.5 |
| 3,414,884 | 12/1968 | Jensen | 340/172.5 |
| 3,560,965 | 2/1971 | White, Jr. et al. | 340/365 |
| 3,564,511 | 2/1971 | Restivo et al. | 340/172.5 |
| 3,573,749 | 4/1971 | Smith et al. | 340/172.5 |

OTHER PUBLICATIONS

Weisber, " Graphic Displays: Matching Man to Machine for On–Line Control;" Control Engineering, November 1968, pages 79– 82.

*Primary Examiner*—Harvey E. Springborn
*Attorney*—Mattern, Ware and Davis

[57] ABSTRACT

A small general purpose digital computer is utilized as the basic element of an industrial controller. The digital computer is provided with an executive program comprising function simulating modules. Relay logic, timer and counter simulating modules are disclosed. The modules provide an iterative format for a control circuit to be simulated the format comprising a large number of identical parallel circuit lines each controlling a numbered relay. Each circuit may have a specified number of basic electrical elements connected in series with its relay. The types of electrical elements disclosed are a normally open switch, a normally closed switch, a branch function, and a wire connection or no function.

The condition of any particular one of the first three types of electrical elements is controlled by a specified one of the number of relays.

A control program comprises a particular choice of electrical elements entered in the circuit lines of the ladder diagram to correspond to an actual circuit diagram of a desired control circuit.

The system is provided with a simple detachable programming panel or console with which an ordinary industrial engineer having no computer programming experience can program his control program by positioning each required basic electrical element in the format provided and specifying the relay of another circuit line controlling the condition of the elements. He enters the set time for each relay which is to be timer controlled. An internal clock is provided for the timing function. He also enters the total count and the simulated relay whose cycles are to be counted for each relay which is to be counter controlled.

A plurality of the numbered relays may each be conditioned only by an external device connected to an identically numbered input terminal. Another plurality of the numbered relays each control the signal supplied to an identically numbered output terminal which may be connected to external devices.

In use, the executive program continuously and repeatedly runs through the ladder diagram control circuit line by line, updating the condition of each electrical element in accordance with the referenced numbered relay; updating the condition of each numbered relay in accordance with the condition of the electrical elements or input terminal in circuit therewith; and updating the condition of each output terminal in accordance with its associated numbered relay.

Provision is made for communicating with the computer controller via ordinary telephone lines from a central station. The original computer controller is delivered to a customer with the executive program in memory. The control program is added by the customer through the detachable programming console. Both the executive and customer chosen control program can then be read out to the central station and printed or recorded on punched tape for full documentation thereof. Further units can be supplied to the customer preprogrammed through use of the punched paper tape. The central station also can communicate with a remote computer controller by means of a central programming console and has the ability to diagnose breakdowns of the computer controller and readin to or readout from any memory location in the remote computer controller.

36 Claims, 36 Drawing Figures

United States Patent
Fletcher et al.
[15] 3,686,639
[45] Aug. 22, 1972
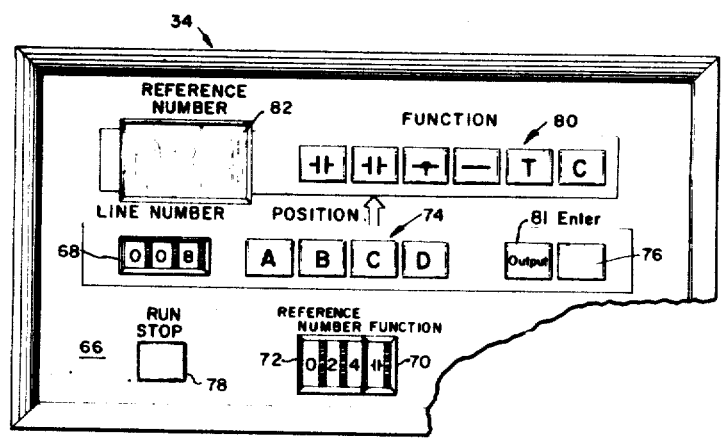

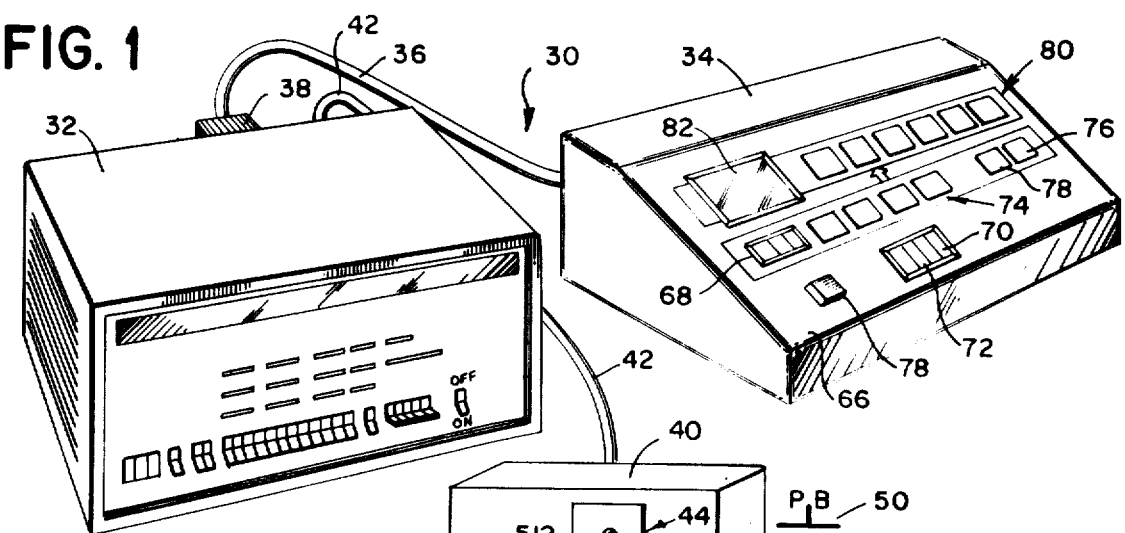
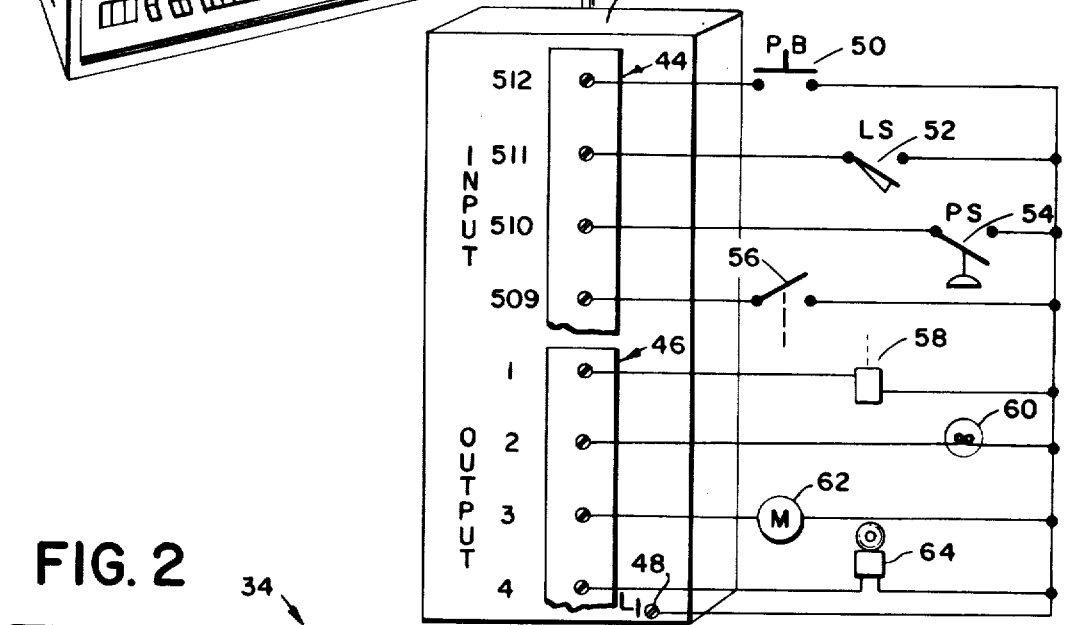
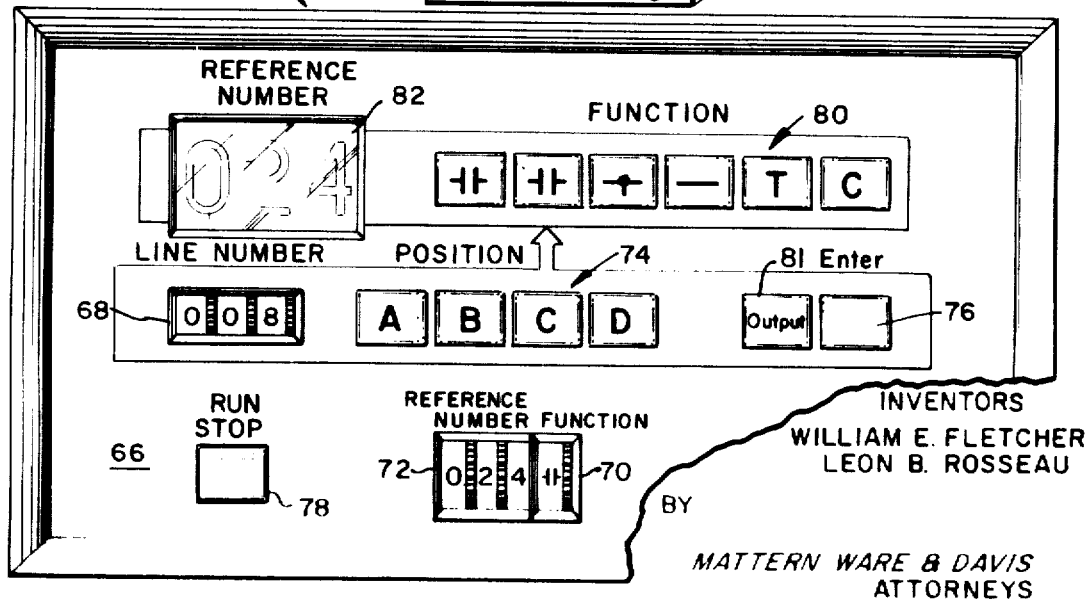

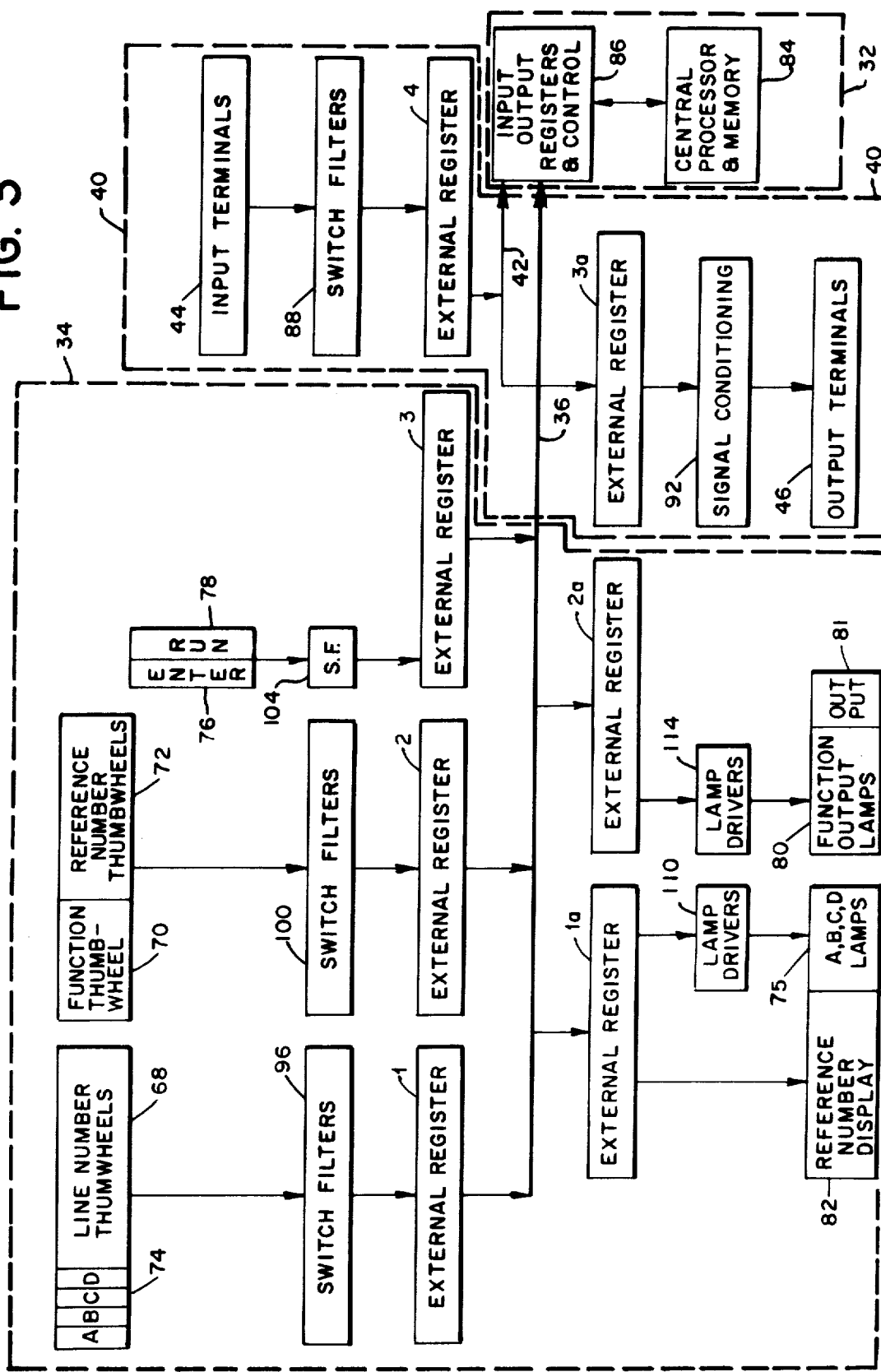

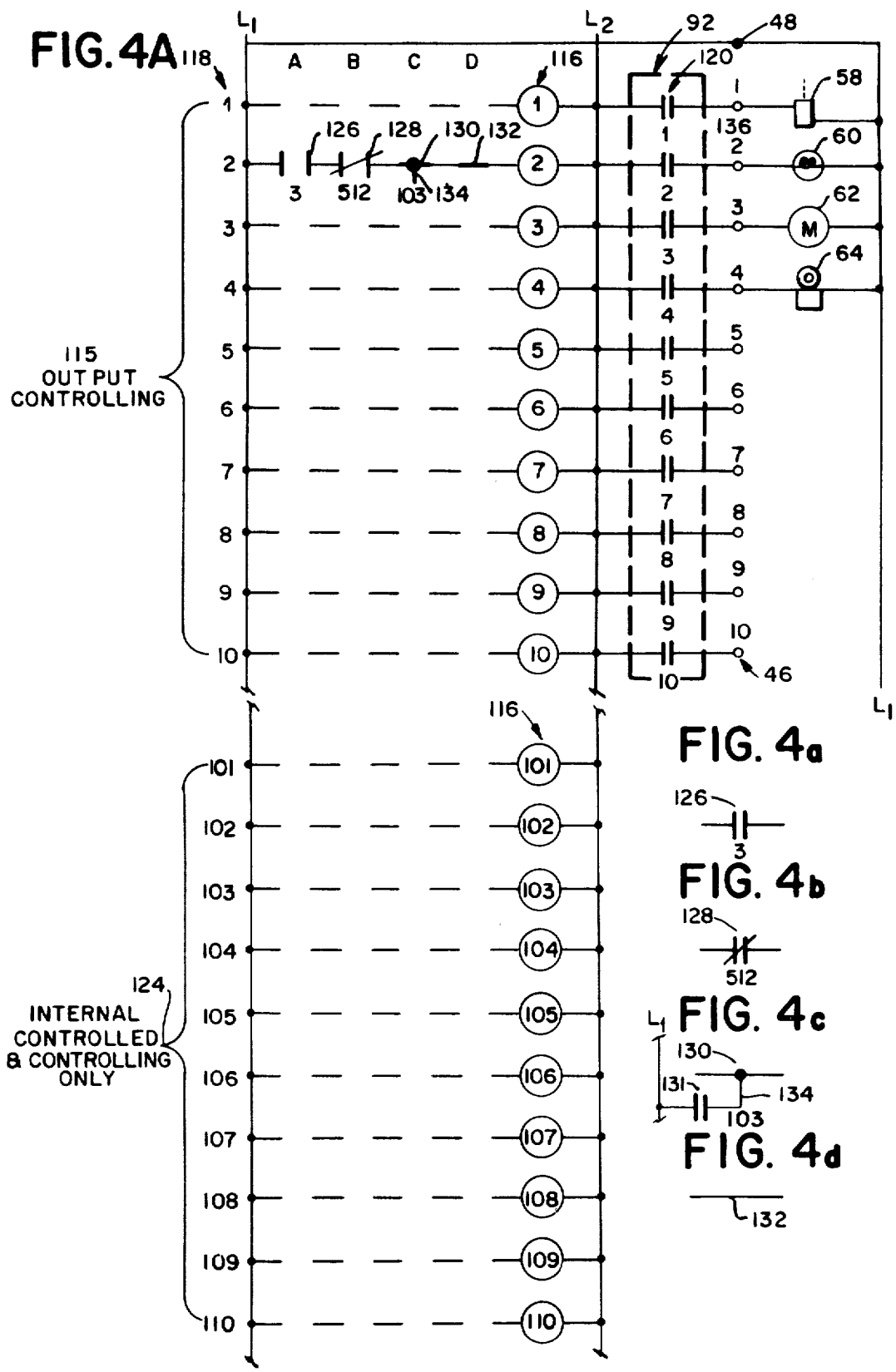

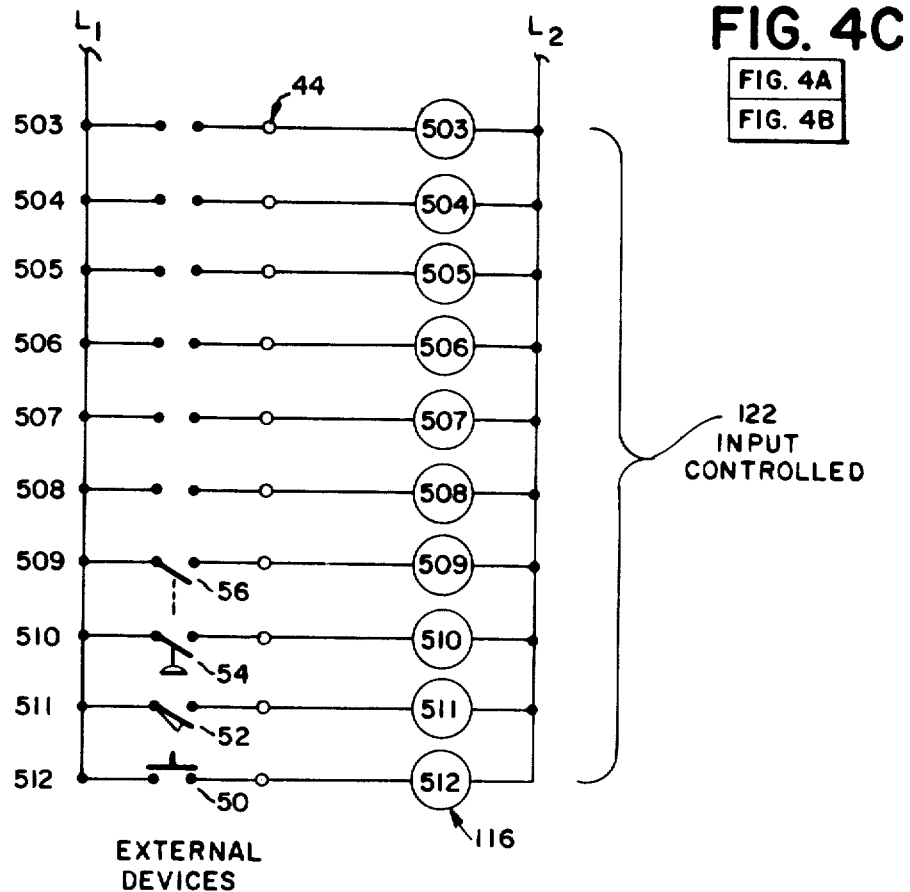
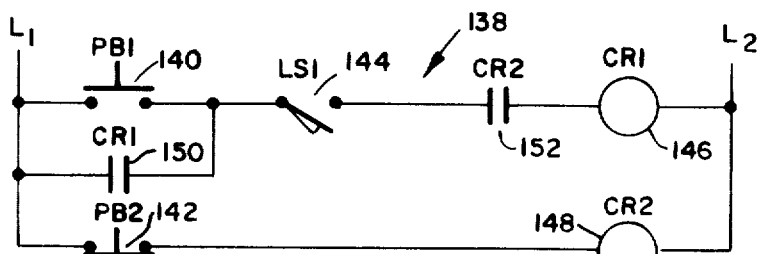
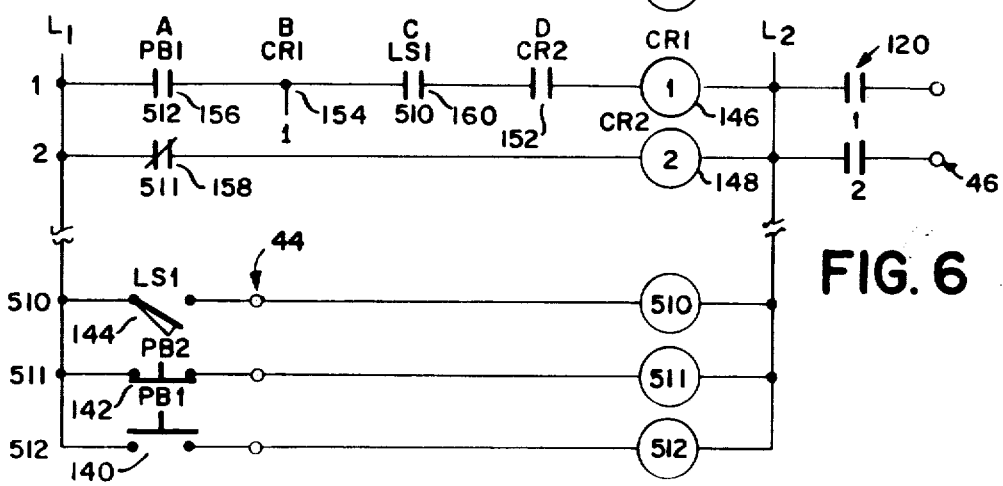

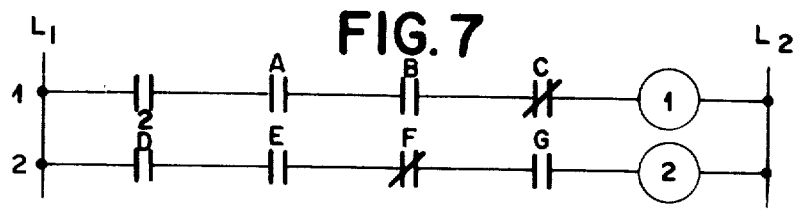
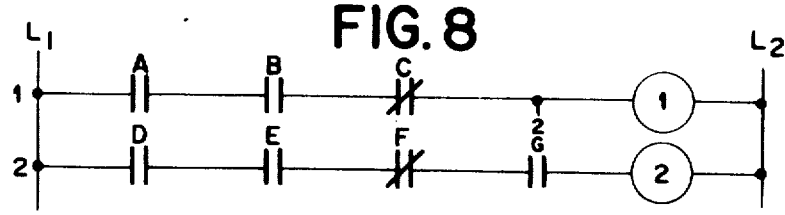
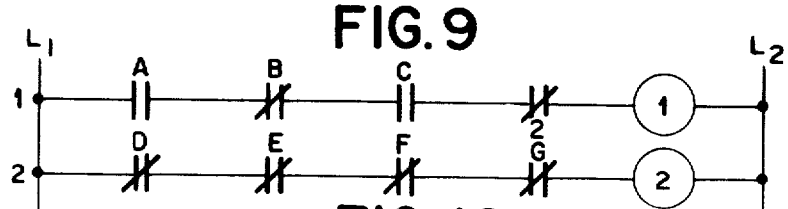
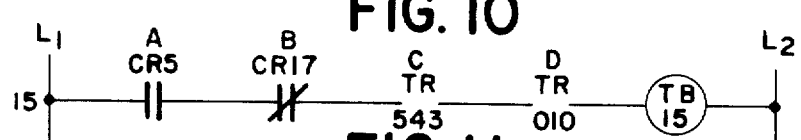
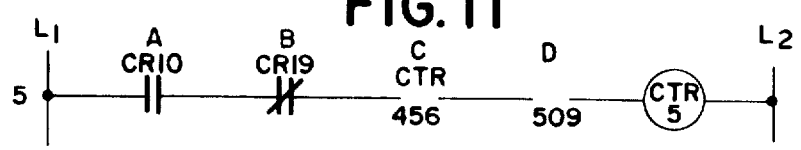
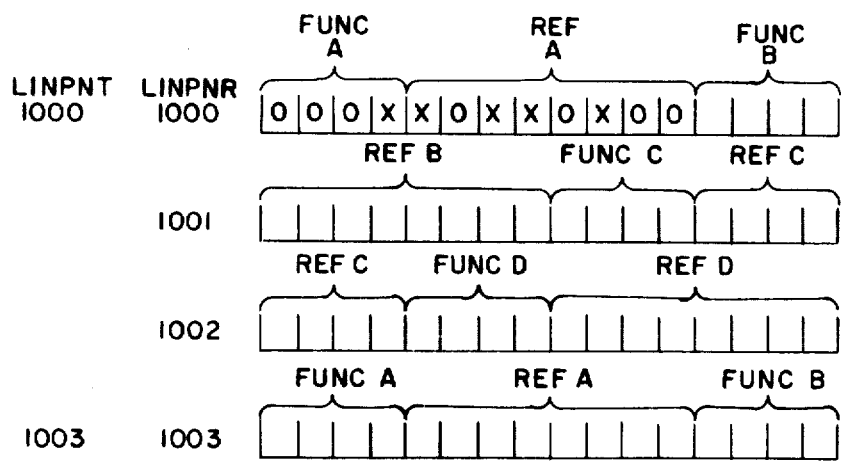
FIG. 12a

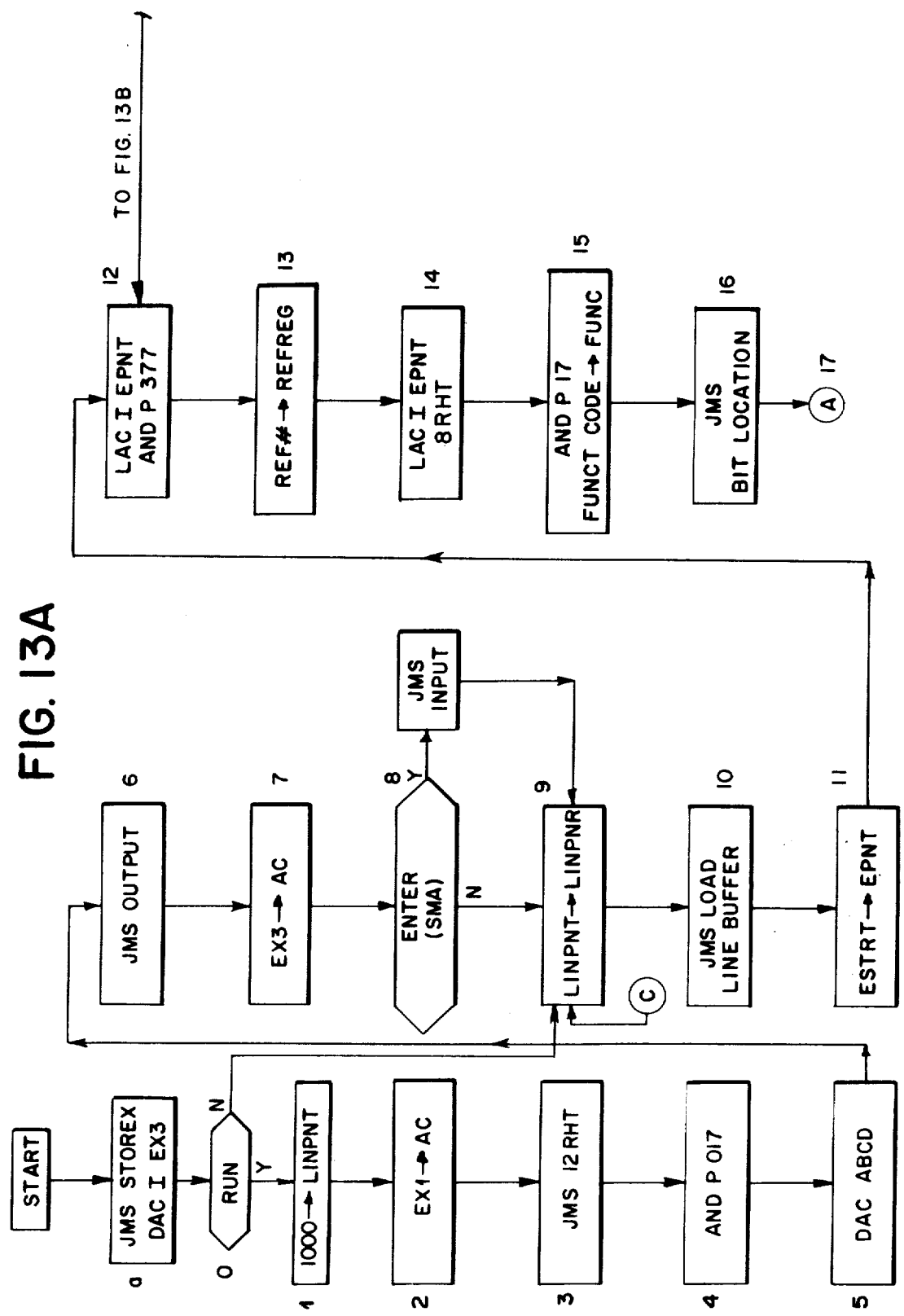

| FIG. 13A | FIG. 13B |
|---|---|
| | FIG. 13C |

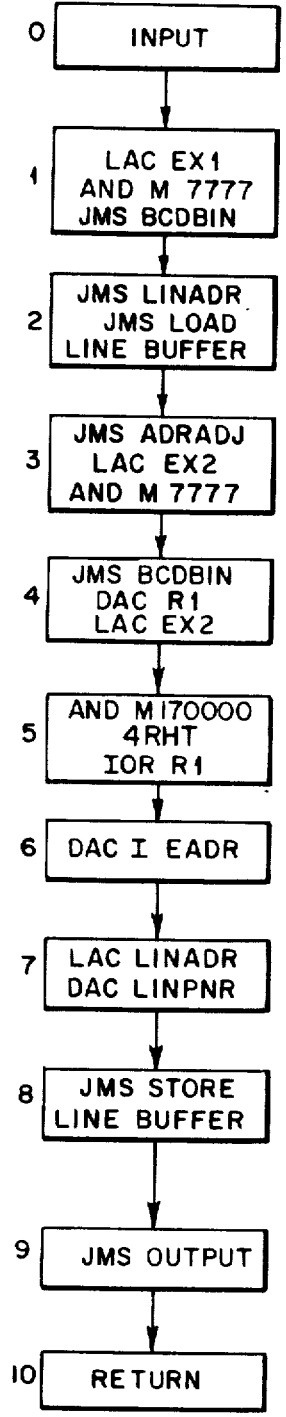
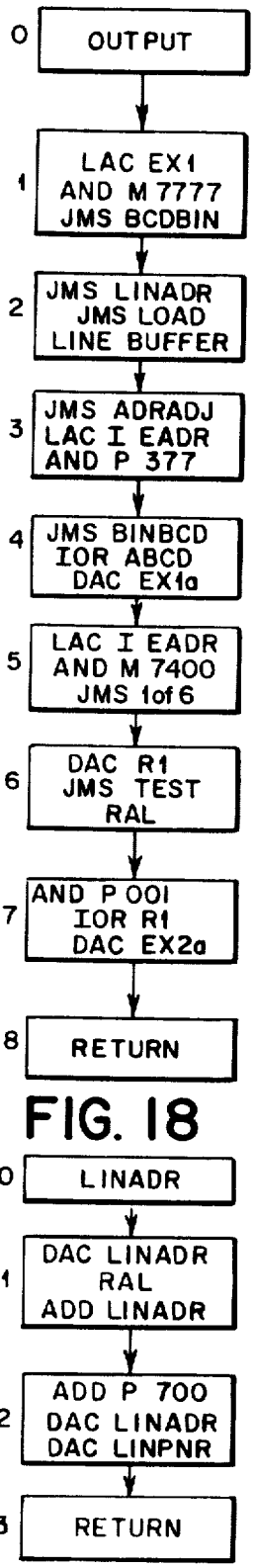
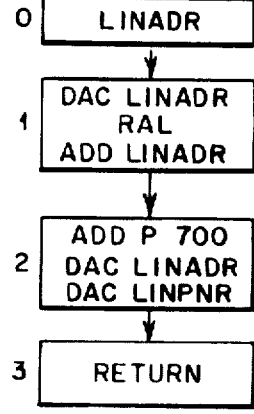
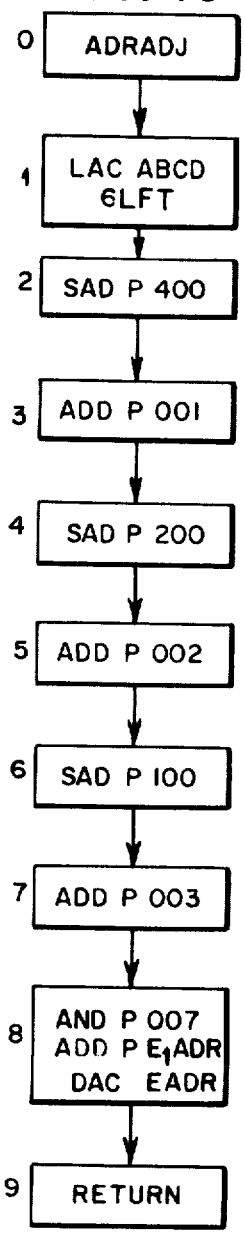
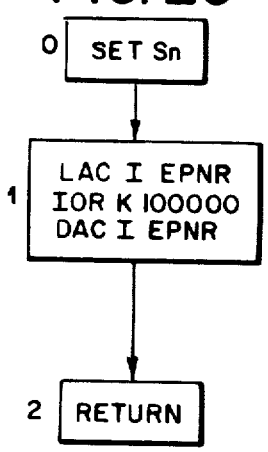
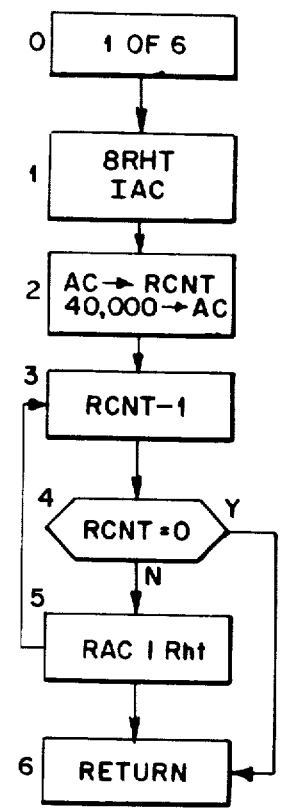

Patented Aug. 22, 1972 3,686,639
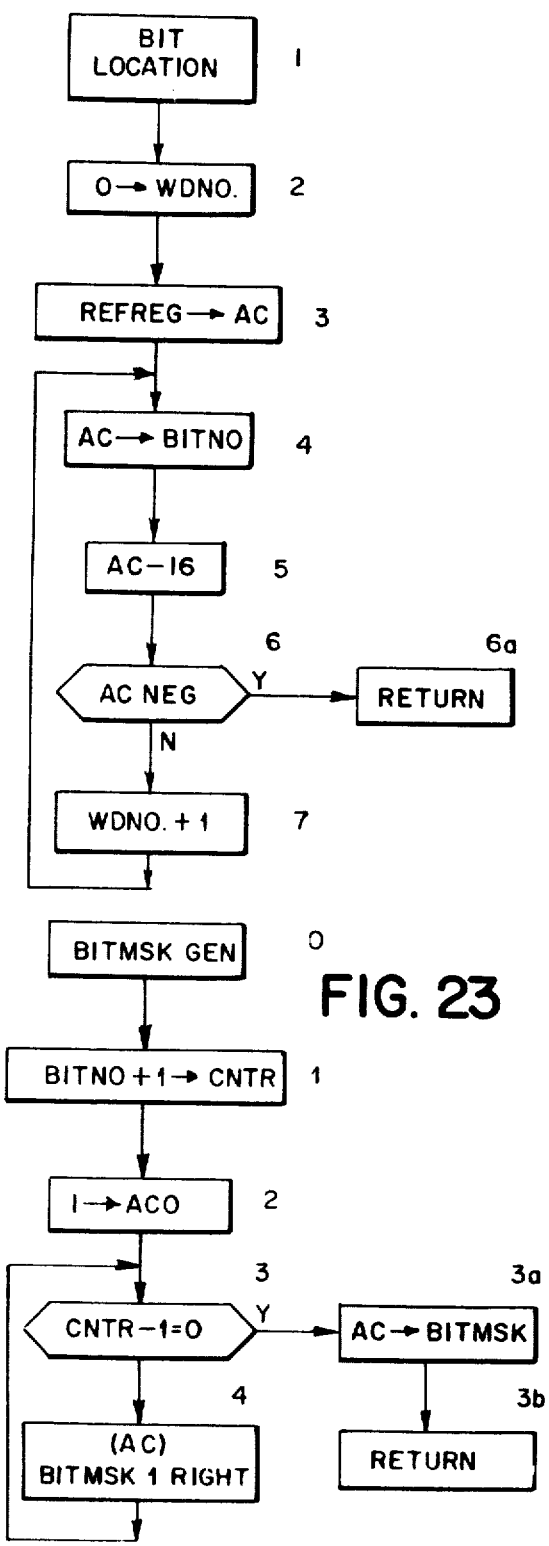
FIG. 22
FIG. 23
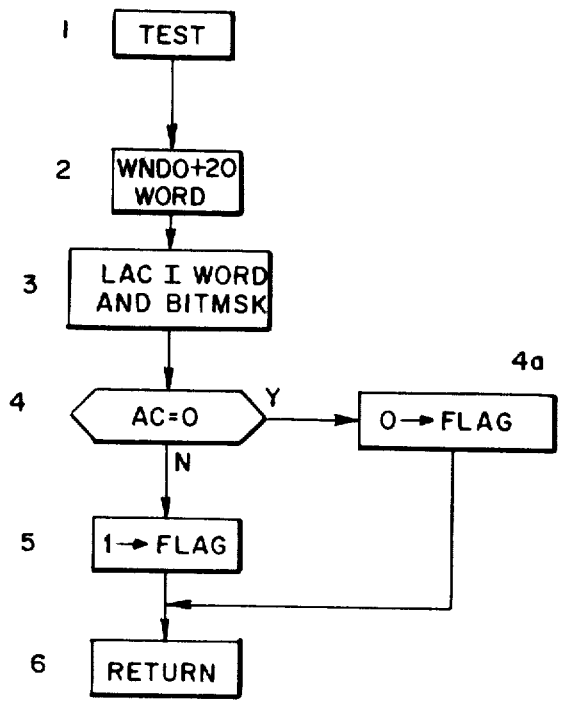
FIG. 24
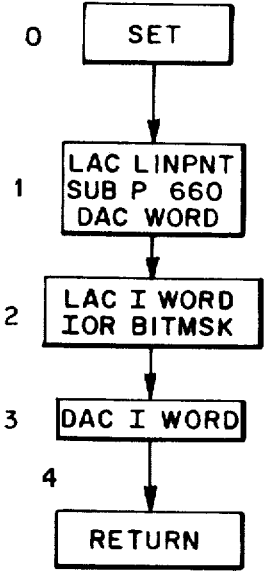
FIG. 25
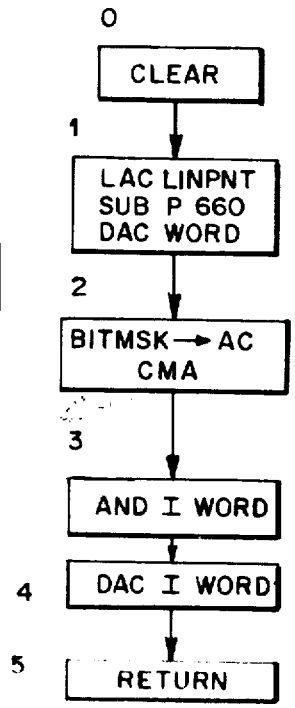
FIG. 26

DIGITAL COMPUTER-INDUSTRIAL CONTROLLER SYSTEM AND APPARATUS

SUMMARY OF THE INVENTION

Ever since the large scale application of digital computers to business and scientific problems in the late 1950's, the application of general purpose digital computers to industrial process control has been considered a desirable goal. Except for rather specialized situations the goal has largely not been reached. Earlier computers were too large and expensive to be utilized except for the most complex of processes. The programming of such computers for a particular process according to prior art methods is a nearly Herculean task requiring large numbers of highly trained programmer hours. Thereafter many hours and much money is expended in debugging the computer program, that is making it work in the industrial process environment. Even when successful a change in the industrial process or system being controlled requires a massive change in the program, again requiring a large number of computer programmer hours.

Even with the mass production in the last few years of small general purpose digital computers relatively few applications to industrial process control have been made. Although the smaller computers may be utilized economically in smaller processes and for example in the control of machine tools, automatic assembly equipment, molding machinery, textile machinery, automatic testing equipment, materials handling equipment, municipal traffic control equipment, chemical processes, and the like, the programming step is difficult and requires talents not generally available in the engineering groups which could use a digital computer industrial controller. Thus each application has required the bringing together of the specialized groups of industrial engineers with the problem, the main frame computer manufacturer with the computer, and the programmers capable of translating the needs of the industrial engineers into a language utilizable by the computer.

Even in those instances where prior art computers have been used as industrial controllers there are many disadvantages. The program utilized in the computer bears no relationship to the industrial process, machine, or the electrical circuit diagram normally utilized by the industrial engineer that the ordinary industrial engineer can understand. Thus for example the change of one relay or one relay contact in an industrial controller which is simulated on a digital computer requires a highly skilled programmer to change the program, according to the prior art.

While prior art industrial control programs for general purpose computers have been highly ingenious in saving computer time this very ingenuity has been a stumbling block in changing the program if the process or machine control has changed in any way.

Another problem of the prior art is that the prior art computer industrial controllers are subject to breakdowns, programming errors and the like which have hithertofore required the attention of skilled hardware and programmer engineers to service and this servicing must take place at the point of application making it prohibitively expensive for many applications.

For these and other reasons the promise of computer industrial controllers has been largely unfulfilled.

Traditionally logic functions found in industrial control systems have been performed by relays. The schematic electrical circuit diagram has been by far the most common technique used for defining how the relays are to be interconnected to form the control logic. One form of schematic electrical circuit diagram used in circuit design in machine control art comprises two spaced apart vertical bus lines each theoretically connected to one terminal of a power supply. Connected between the parallel vertical lines are horizontal "circuit lines," hence this particular form of schematic electrical circuit diagram resembles a ladder and is often referred to as a ladder diagram.

Each circuit line terminates in a relay, and preceding the relay are a plurality of electrical elements, such as switches, which consequently control the operation of the relay to provide an output signal when the circuit line conducts. This corresponds to an AND function, and an OR function is provided by drawing another circuit line having elements therein and connecting this circuit line into a different circuit line preceding its relay.

After the schematic electrical circuit diagram has been drawn, an actual control system is hand wired corresponding thereto. An electrical element in the circuit line may be operated by one of the relays, and is so labeled on the diagram. Other elements may also be operated by relays, or by the controlled machinery. When the actual circuit is built, the relay is connected to operate that element. The diagram is consulted for the necessary interconnections. Thus, the relay and the schematic electrical circuit diagram have formed a team that has been successfully used for many years.

However this team does have limitations. The relay being an electromechanical device has a limited life. It requires expensive hand wiring by electricians. Changes and corrections to relay logic are time-consuming and expensive. The circuit diagram as a document defining a control scheme has its limitations. It is often not updated when checkout unearths logic errors. As a result, it is often difficult to determine exactly what control system has been built. Similar undocumented changes occur during servicing and often result in erratic behavior and major breakdowns.

Additionally, relays have a fixed number of contacts. This must be taken into account in the original design and often makes "debugging" and service changes very expensive and time consuming. Redesigning of an existing system due to minor changes in function can be a major undertaking because of these inherent limitations of hardware relays.

OBJECTS OF THE INVENTION

It is therefore an object of the invention to provide a general purpose computer controller.

Another object of the invention is to provide a computer controller of the above character utilizing a general purpose executive program and a special purpose control program.

Still another object of the invention is to provide a computer controller of the above character wherein the executive program and the special purpose control program are cast in the form of a conventional schematic electrical circuit diagram.

Yet another object of the invention is to provide a computer controller of the above character having a special purpose programming panel for programming the computer with the control program by an industrial engineer unfamiliar with common computer programming languages.

A further object of the invention is to provide a computer controller of the above character wherein the computer time is sacrificed in order to facilitate convenience in programming.

A still further object of the invention is to provide a computer controller of the above character programmed to perform the functions of relay logic.

A yet further object of the invention is to provide a computer controller of the above character wherein relays are simulated and have no limitation on the number of terminals or contacts of a relay so provided.

Another object of the invention is to provide a computer controller of the above character programmed to perform the functions of selectable timers.

Still another object of the invention is to provide a computer controller of the above character programmed to perform the functions of selectable counters.

Yet another object of the invention is to provide a computer controller of the above character having no limitation on the number of functions to be timed or counted by the same timer and counter.

Still yet another object of the invention is to provide a plurality of computer controllers of the above character and a detachable programming panel which may be utilized therewith.

A further object of the invention is to provide a computer controller of the above character and a system for communicating therewith over long distances.

A still further object of the invention is to provide a system of the above character for communicating over voice grade telephone lines.

A yet further object of the invention is to provide a system of the above character providing remote servicing of the computer controller from a central station.

Another object of the invention is to provide a system of the above character providing readout of the executive or control programs at a central station.

Still another object of the invention is to provide a system of the above character providing for read-in of the executive or control programs from a central station.

Yet another object of the invention is to provide a system of the above character providing for debugging, diagnosing and correction of malfunctions from a central station.

A still further object of the invention is to provide a computer controller and system of the above character that is inexpensive, simple to operate and reliable.

Other objects of the invention will in part be obvious and will in part appear hereinafter.

The invention accordingly comprises a system, apparatus and method comprising the means, features of operation, combinations of functions and the relationships of one or more of such operations and functions with respect to each of the others of the system; the features of construction, combinations of elements and arrangements of parts of the apparatus which are adapted to effect such operations and functions; and a method comprising the several steps and the relation of one or more of such steps with respect to each of the others; all as exemplified in the following detailed disclosure. The scope of the invention is indicated in the claims.

GENERAL DESCRIPTION OF THE INVENTION

According to the present invention a small general purpose digital computer performs all of the functions of an industrial controller hithertofore performed by relay logic, timers, and counters connected in a complex electrical control circuit. The general purpose digital computer is supplied with executive programs having modular portions for simulating each of these functions. A special purpose control program cooperating with the executive program and corresponding to the electrical circuit diagram of the industrial apparatus, system, or process to be controlled is programmed into the computer through a detachable programming panel. No knowledge of conventional digital computer programming or programming languages is required. The programmed computer controller is connected to the apparatus and controls it according to the electrical circuit diagram.

According to the invention relay logic to be simulated or performed by the computer is redrawn, i.e. transformed, into a schematic electrical circuit diagram comprising a ladder network of circuit lines disposed between two vertical bus lines. Each circuit line comprises a predetermined number (which in the embodiment disclosed is four) of serially connected preselectable conventional electrical circuit elements preceding a relay coil which is energized when the elements are conditioned so that the circuit line conducts. The selectable elements are a normally open switch (open contacts), a normally closed switch (closed contacts), a direct electrical connection (no operation) and a branch element (an electrical "T" node). The user thus makes a tabular listing consisting of rows of four elements each connected in series to a relay coil by a simple straight forward conversion from his conventional electrical circuit diagram of the ladder type, using the branch element as necessary when a line of the conventional electrical circuit diagram contains more than four electrical elements. Limiting the number of elements in each circuit line is desirable to obtain a uniform format programmed into the computer as a part of the executive program.

The condition of any electrical element drawn in the ladder diagram may be specified to be the condition of any relay coil, i.e. to determine the condition of an electrical element, the executive program will examine the condition of the specified relay. If the electrical element is a normally open switch and the specified relay is positive or energized, the switch is "closed" by the relay and that portion of the circuit line conducts. If all four electrical elements of a line conduct, the relay at the end of that circuit line is energized. Additionally, the executive program stored in the computer provides for three groups of circuit lines. A first group of circuit lines each provides for a single internally simulated relay, the instantaneous condition of which may be specified by an externally connected device. The second group of circuit lines each provides for four internally simulated and conditioned electrical elements and an internally simulated relay used only to specify the condition of electrical elements in the ladder diagram. The third group of circuit lines each provides for four internally simulated and conditioned electrical elements and for the operation of an external device by that group's internally simulated relay coil.

Timers are represented by their timer interval and a tens multiplier, i.e. decimal place. Counters are represented by their total count and the number of the internally simulated relay whose cycles are to be counted.

In programming the computer with the control program i.e. specifying electrical elements in the circuit lines, the operator sets one set of thumb wheel dials of the programming panel to the reference number of one circuit line of the tabular ladder diagram (transformed circuit diagram); selects the electrical element desired with a thumb wheel on the programming panel; and sets another set of thumb wheels on the programming panel to identify which internally simulated relay specifies the condition of the selected element. He enters the element in the desired position in the line by depressing a position button and an entry button Two positions in each circuit line are available for the possible respective entry of the total count and relay to be counted for a counter or the time interval and tens multiplier for a timer. The relay identifying thumb wheels are used to enter these numbers. The counters count and timers time when continuity is established in the other positions of that circuit line.

The programming panel continuously displays the type of electrical element and the reference number of the relay governing its condition for one position of a selected circuit line. Position selection buttons on the programming panel permit the operator to select any one of the four positions in a circuit line for display.

The programming panel or console is detachable and may be used to service a plurality of computer controllers at different times.

The executive program continuously runs through the programmed circuit lines of the electrical ladder network whereby the computer controller performs its specified control function. The simulated relay controlled electrical elements in each circuit line are updated in accordance with the condition of its respective controlling relay. The simulated relays and the relay at the end of the circuit line is energized if the circuit line conducts each controlled by an external input are similarly updated in accordance with the external signal supplied. The output terminal signals are also updated in accordance with their corresponding simulated relays. Timers count internally generated clock pulses if the two remaining simulated electrical elements in their circuit line establish electrical continuity. If the total number of clock pulses counted is equal to the timer setting the internally simulated relay of the circuit line wherein the timer is entered is set to its energized condition. Similarly a counter counts the referenced relay cycles of the first electrical element in its circuit line if continuity is established in the second electrical elements of its respective circuit line and it energizes its internally simulated relay when the total count has been reached. If the second element becomes non-conductive, the counter starts over from zero.

This continuous operation is so rapid that the entire controller program ladder diagram is updated by the executive program in a shorter period of time than is required for the computer-controller to react to any external input and similarly in a shorter period of time than that in which any external device can respond to a signal from the controller. Thus, the fact that the instantaneous condition of the internally simulated circuit may not be entirely correct (in that for example switches operated by the same relay) may be partially operated in accordance with the condition of the relay and partially not yet operated in accordance with the condition of the relay is immaterial. This situation arises because the circuit lines are examined in order, and relays governing the condition of the elements in the circuit lines are usually not referenced in order.

The executive program also checks once each cycle to see if the programming panel has requested entry or output of data and provides the step of appropriate entry or output.

The invention further provides means for connecting the computer controller to a central station through accoustic couplers over normal, voice grade, telephone lines. A central station is provided comprising a computer and appropriate input and output devices for reading executive and control programs into the remote computer controller, for diagnosing and debugging through access to any memory location both to read in and read out information.

Full documentation of the control program stored in any remote computer controller can thus be provided. The control program may be printed in the form of the ladder network together with the reference numbers, timer intervals, total counts, etc. Subsequent controllers for an identical process or machine can be supplied with both the executive and control program stored in memory. In case of loss of memory the programs may be supplied by telephone on short notice. Similarly, new control programs may be supplied from a central library.

THE DRAWINGS

For a further understanding of the nature and objects of the invention, reference should be had to the following detailed description taken in connection with the accompanying drawings in which:

FIG. 1 is a perspective partially diagrammatic view of a computer controller system according to the invention;

FIG. 2 is a front view of the detachable programming panel or console of the computer controller system of FIG. 1;

FIG. 3 is a schematic block diagram of the computer controller system of FIG. 1;

Figure 12B:
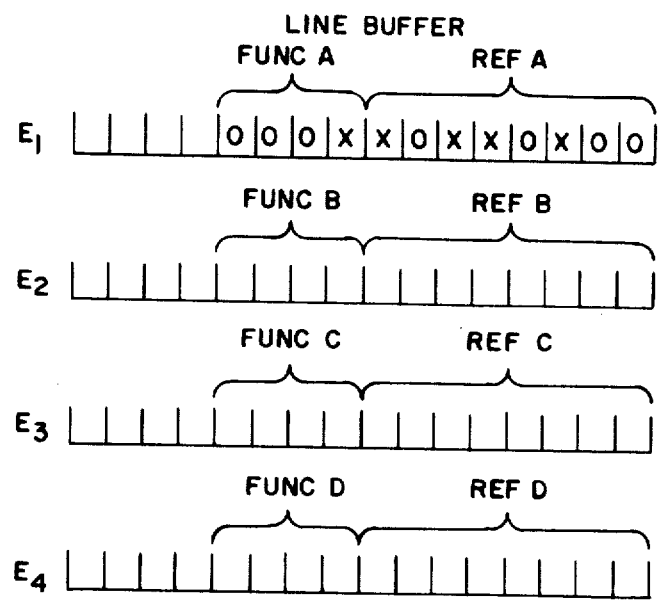
Figures 13B, 13C:
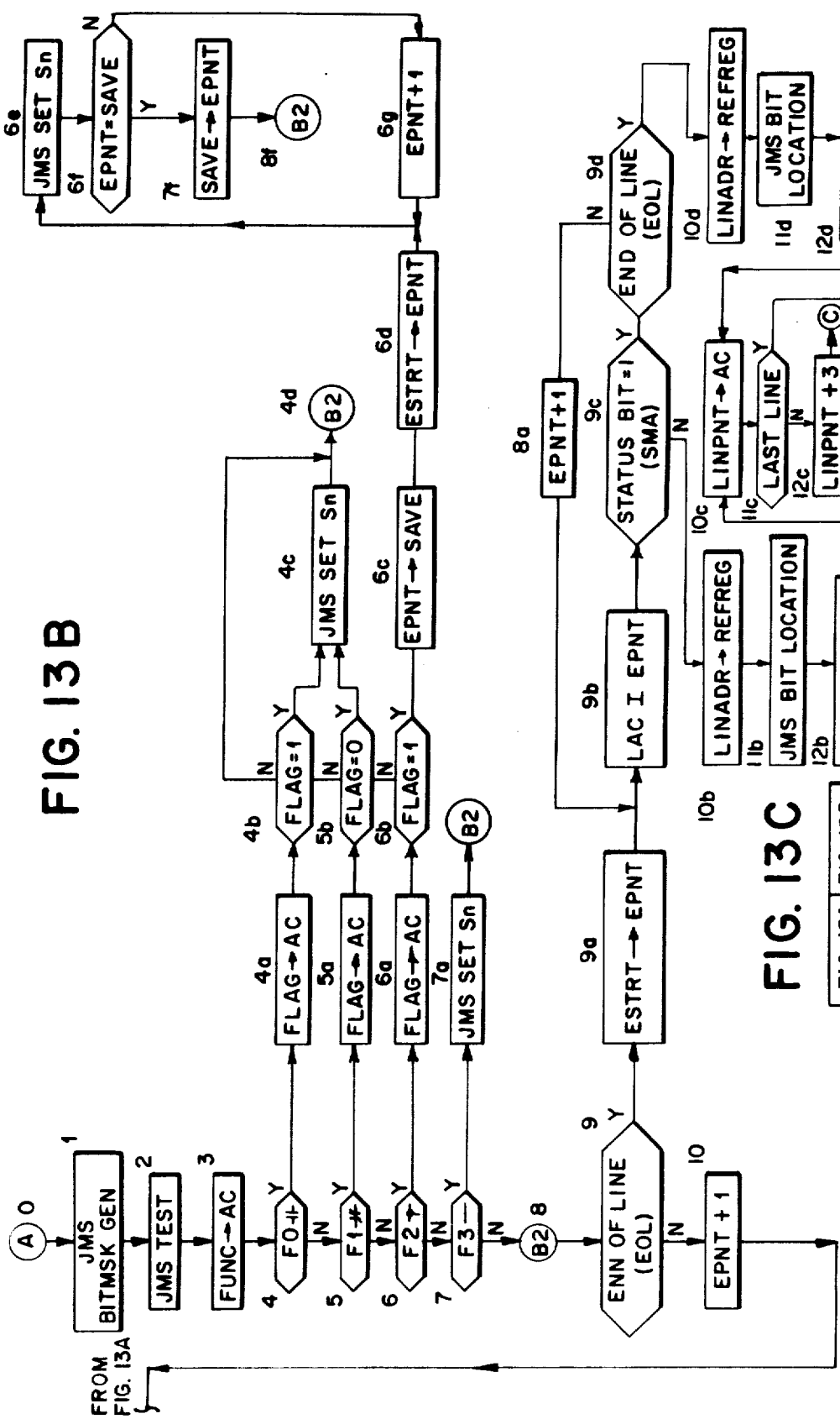
Figure 27:
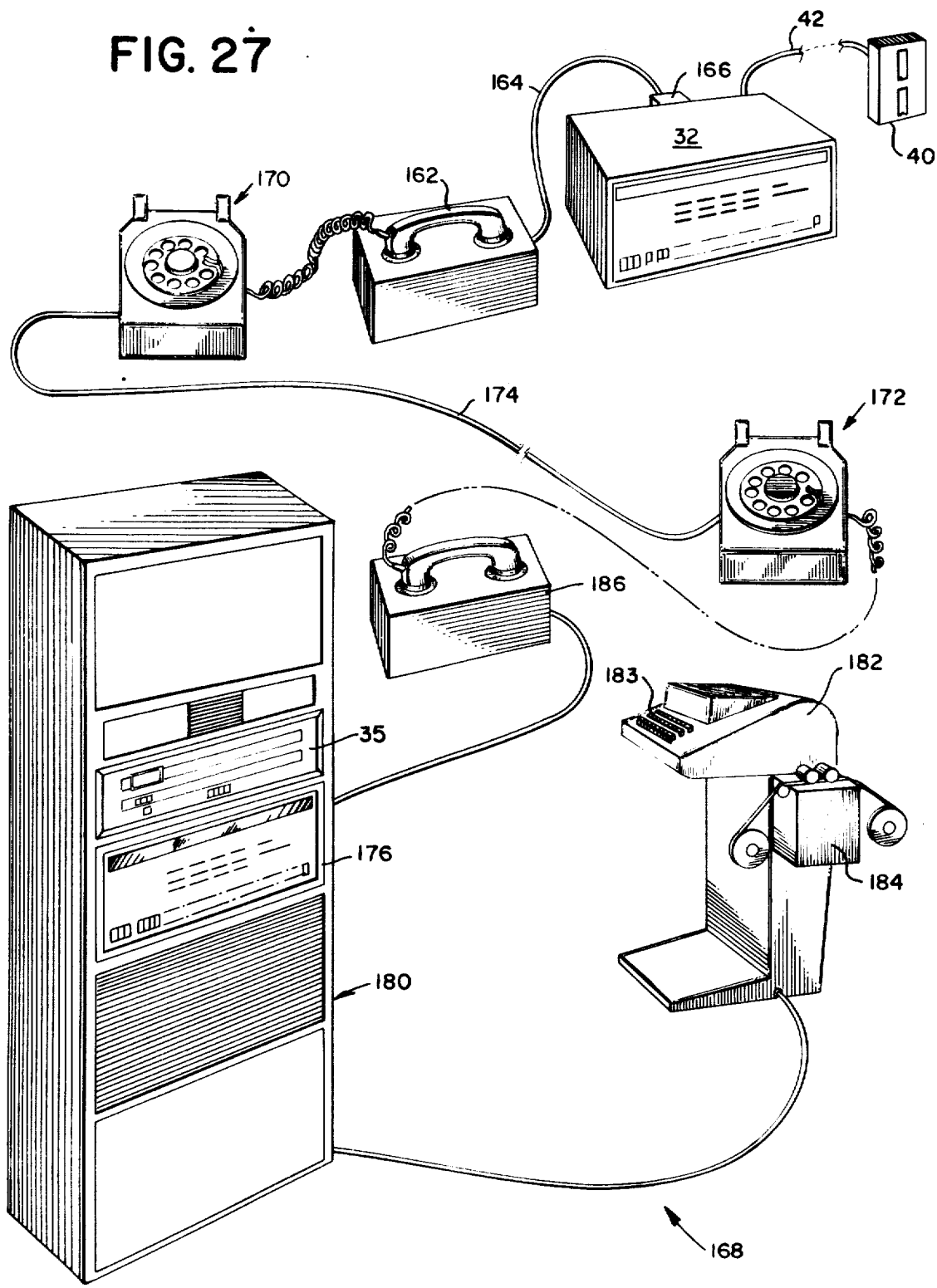

FIG. 4 comprising FIGS. 4A and 4B is a schematic diagram showing the ladder diagram form of electrical control circuit that is simulated by the computer controller system of FIG. 1;

FIG. 4C is a diagram showing how FIGS. 4A and 4B are put together to form FIG. 4;

FIGS. 4a, 4b, 4c and 4d are the schematic electrical symbols of the electrical elements which may be entered into the blank positions of the ladder diagram of FIG. 4 through use of the programming panel;

FIG. 5 is a conventional electrical circuit diagram of a control circuit;

FIG. 6 is a transformed electrical circuit diagram equivalent to the electrical circuit diagram of FIG. 5 according to the scheme of FIG. 4 suitable for direct entry into the computer controller using the programming panel of FIG. 2;

FIG. 7 is a circuit diagram according to the scheme of FIG. 4 showing provision for the series, or logical AND function of more than four relays according to the invention;

FIG. 8 is a circuit diagram according to the scheme of FIG. 4 showing provision for the parallel, or logical OR, function of two circuit lines according to the invention;

FIG. 9 is a circuit diagram according to the scheme of FIG. 4 showing an alternative provision for the parallel, or logical OR, function of more than two circuit lines according to the invention;

FIG. 10 is a portion of a ladder diagram according to the scheme of FIG. 4 showing how a timer is entered into the four positions of a circuit line;

FIG. 11 is a portion of a ladder diagram according to the scheme of FIG. 4 showing how a counter is entered into the four positions of a circuit line;

FIG. 12a is a schematic diagram showing an internal data allocation scheme or data format utilized by the computer controller system of FIG. 1;

FIG. 12b is a diagram of an intermediate internal data allocation scheme or data format utilized by the computer controller system of FIG. 1;

FIG. 13 comprising FIG. 13A and FIG. 13B is a flow chart of an executive program according to the invention utilized by the computer controller system of FIG. 1;

FIG. 13C is a diagram showing how FIGS. 13A and 13B are put together to form FIG. 13;

FIGS. 14 through 26 are flow charts of subroutines of the program of FIG. 13; and FIG. 27 is a perspective view of the computer controller system of FIG. 1 communicating over a voice grade telephone line with a central station according to the invention.

The same reference characters refer to the same elements throughout the several views of the drawings.

DETAILED DESCRIPTION

The System and Method of Programming

Now referring to FIG. 1, a computer controller system according to the invention is generally indicated at 30. It comprises a small general purpose computer, generally indicated at 32, which may for example be one of the recently introduced 16 bit word machines. Those skilled in the art will recognize the front panel of the computer 32 to be that of a Digital Equipment Corp. Model PDP-8/L, and will further recognize the mnemonics used in the program flow chart are primarily those associated with the Digital Equipment Corp. family of computers. A programming panel 34 according to the invention is connected via cable 36 to the general purpose computer 32 and may be detached therefrom by removing connector 38. A plurality of external registers and signal conditioning circuits (see FIG. 3) are mounted in an input-output box 40 which is connected to computer 32 via cable 42. The input-output box can of course be an integral part and mounted on a single chassis with the computer 32. The input-output box 40 provides a plurality of input terminals generally indicated at 44, a plurality of output terminals generally indicated at 46 and $L_1$ line terminal 48.

Referring still to FIG. 1, the input terminals 44 are connected in circuit with $L_1$ terminal 48 through externally operated devices such as push button 50, limit switch 52, pressure switch 54 and relay contacts 56. Similar signals could be supplied to the input terminals 44 by means of isolation transformers, solid state switches, and the like. External devices are energized from output terminals 46 — as for example, external relay 58, lamp 60, motor 62 and alarm 64. All external devices are connected to $L_1$ via terminal 48. Many other external devices may be driven by the output levels appearing at terminals 46 — as, for example, transformers, electronic amplifiers, solid state relays, and the like.

Now referring to FIG. 2, the front panel 66 of the detachable programming console 34 is shown in detail. Each of a plurality of lines of a standard form schematic electrical circuit diagram as shown in FIG. 4 (circuit lines of series logic) may be selected by setting a line number by means of LINE NUMBER thumb wheels 68. A electrical element to be inserted into one of the four positions the line is selected by means of FUNCTION thumb wheels 70. The line number of the relay whose instantaneous condition is to govern the instantaneous condition of the electrical element selected, is selected by setting REFERENCE NUMBER thumb wheels 72. The reference number and electrical element selected may then be entered in a selected position in the specified line by depressing one of four latching POSITION pushbuttons, generally indicated at 74, and an ENTER pushbutton 76.

The electrical element entered at the selected position indicated by the latched POSITION button 74 will then be displayed by illuminating one of six function output lamps, generally indicated at 80 under the "FUNCTION" label. The "T" and "C" displays indicate timers and counters. The associated reference number will be displayed at reference number output display 82. The POSITION button 74 which was depressed and thereby latched will be indicated by illumination of a POSITION lamp 75 (FIG. 3) behind the corresponding push button 74. The status of the relay of the line selected by LINE NUMBER thumb wheels 68 is continuously indicated by an OUTPUT lamp 81 (FIG. 3), i.e. if the electrical elements in the line selected by the LINE NUMBER thumb wheels all conduct, the relay at the end of the line is energized, and is indicated to be energized by illumination of OUTPUT lamp 81.

The above steps are repeated for entry of each electrical element into the ladder diagram of FIG. 4. The operator enters the type and number of electrical elements at selected positions of selected lines to cause the ladder diagram of FIG. 4 to represent a control circuit. Therefore, the information comprising the various electrical elements entered, the lines and positions at which they are entered, and the referenced relays controlling the conducting status of the electrical elements is referred to as a control program.

Now referring to FIG. 3, the computer 32 comprises a central processor and memory unit 84, and input-output registers control unit 86. The computer 32 is any general purpose digital computer, and in particular may be a Digital Equipment Corp. Model PDP–8/L computer. Input terminals 44 are connected through conventional switch filters 88 to each control the setting of one bit of an external register 4. Under control of the central processor 84, through the input-output registers and control unit 86, the contents of external register 4 may be read into the memory of the central processor in conventional fashion. Similarly, output terminals 46 are each supplied with a signal from signal conditioning circuits 92 in accordance with the status of one bit each in external register 3a. The central processor 84 through the input-output registers and control unit 86 sets the condition of the individual bits of external register 3a in a conventional manner. Communication between the input-output registers and control unit 86 and the external registers 4 and 3a is via cable 42. As will be understood by those skilled in the art, there may be more than one external register 4 for inputs and more than one external register 3a for outputs, depending on the number of input and output terminals 44 and 46 provided for, the internal organization of the computer 32, and the number of bits of the external registers. The switch filters 88 are K508AC input converters (120 VAC) shown at pages 174 and 175 of Digital Equipment Corporations 1969 Logic Handbook, C1351800–3169, and the external registers 3a and 4 are M375 registers shown at pages 100–102 of the same handbook. The signal conditioning circuits 92 are such as K604 isolated AC switch-registers shown at pages 190 and 191 of the same handbook.

As previously explained with reference to FIG. 1, the detachable programming console 34 is connected to the computer 32 via cable 36. This communication is through the input output or external registers and control unit 86 to and from the central processor and memory 84 in a conventional manner. The POSITION selector pushbuttons 74 and LINE NUMBER thumb wheels 68 are connected through switch filters 96 which in turn are connected to external register 1. Similarly, FUNCTION thumb wheel 70 and REFERENCE NUMBER thumb wheels 72 are connected in a conventional fashion through switch filters 100, which in turn are connected to external register 2. In a similar way, the ENTER and RUN push buttons 76 and 78 are connected to switch filters 104, which in turn are connected to external register 3. External registers, 1, 2 and 3 communicate via cable 36 with input-output registers and control unit 86. Thus, on demand of the central processor and memory unit 84 the information stored in the external registers 1, 2 and 3 which reflects the condition of the various programming input devices 68, 70, 72, 74, 76 and 78 of the programming panel 34 may be transferred to the central processor and memory unit 84 through the input-output registers and control unit 86. Switch filters 96, 100, and 104 are such as K580 dry contact filters shown at pages 186 and 187 of the 1969 Logic Handbook referred to above. External registers 1, 2 and 3 are the same as registers 3a and 4 described above, as are registers 1a and 2a.

External register 1a is provided, a portion of which may be used to control REFERENCE NUMBER display 82. This may be the type sold under the trademark NIXIE. Another portion of external register 1a is used to control lamp drivers 110 to illuminate POSITION lamps 75 mounted behind POSITION push buttons 74 (FIG. 2). Similarly, external register 2a governs lamp drivers 114 to control the illumination of FUNCTION output lamps 80 and OUTPUT lamp 81. External registers 1a and 2a are set via cable 36 from input-output registers and control unit 86 under control of the central processor and memory unit 84 of the computer 32. The lamp drivers 110 and 114 may be K681 lamp drivers shown at pages 200 and 201 of the 1969 Logic Handbook.

Now referring to FIG. 4, according to the invention any conventional relay logic circuit is transformed according to the well known rules of electrical network transformation into a network according to the ladder diagram or schematic electrical circuit diagram illustrated in FIG. 4. According to this diagram, there are provided the usual electrical supply lines L1 and L2 between which all horizontal circuit lines are connected. The diagram provides for a large plurality of such circuit lines which may, for example, be as many as 512, as illustrated in FIG. 4. When continuity is established on a line, i.e. when all the electrical elements positioned therein conduct, the corresponding one of a plurality of relays, generally indicated at 116, is energized. The lines are numbered in column 118 at the left and each relay is identically numbered, as shown.

A group of lines 115, as for example lines 1 to 10 (FIG. 4A) contain relays 1 to 10 which have the capability of governing the condition of one of the identically numbered external output terminals 46 i.e. the energized or non-energized status of the relay is transferred as a positive or negative signal to the corresponding bit of external register 3a. Thus the condition of each of a plurality of switches, generally indicated at 120, in each of these lines is governed by the condition of the corresponding relay 116. The switches 120 correspond to a portion of the signal conditioning circuitry 92 (see also FIG. 3).

The external devices such as the relay 58, lamp 60, motor 62 and alarm 64 are connected between the appropriate one of the output terminals 46 and $L_1$ via $L_1$ terminal 48 (see also FIG. 1).

Another group of lines 122 (FIG. 4B) have their relays 116 conditioned in accordance with whether $L_1$ is connected to the corresponding one of the input terminals 44 through an external device such as push button 50, limit switch 52, pressure switch 54 or relay contact 56.

A third group of lines 124 (FIG. 4A) are internally controlled and control internal devices only. A relay in these circuit lines is energized in accordance with the condition of the preceding elements, and the relay is available to be referenced for determining the condition of any electrical element in the diagram. However, no output to an output terminal is available from these circuit lines.

Each of the circuit lines of the ladder diagram is provided with four positions A, B, C and D in which an electrical element may be specified. These electrical elements may be as shown in FIG. 4a, a normally opened relay contact or normally open switch 126; as shown in a FIG. 4b, a normally closed relay contact or normally closed switch 128; as shown in FIG. 4c, a a branch function 130; and; as shown in FIG. 4d, an electrical wire connection 132, i.e. no function or always conducting.

According to the invention, the instantaneous condition of each of the elements 126, 138 and the relay contacts 131 of branch element 130 is specified by the condition of one of the relays 116, the particular one being that one whose reference number the element is given by means of the REFERENCE NUMBER thumb wheels 72 (FIG. 2). In drawing the control circuit diagram in accordance with the scheme of FIG. 4, a number is written below each of the elements 126, 128 and 130 which is the reference number that identifies the relay controlling the normally open or normally closed switch or in the case of the branch function 130 when the referenced relay is energized, $L_1$ is connected to the vertical branch 134 through contacts 131. It will be apparent to those skilled in the art that this provides a logical OR function.

Thus, for example, switch normally open 126 illustrated in FIG. 4A is governed by the condition of relay 3 in circuit line 3, which happens to be one of the output controlling lines 115 of FIG. 4. Normally closed switch 128 is governed by the condition of relay 512, which happens to be in the input controlled group of lines 122. Thus, if push button switch 50 is closed, relay 512 is energized and normally closed switch 128 is opened. When relay 3 is energized, normally open switch 126 is closed. When relay 103 of the internal controlled and controlling circuit lines 124 is energized, then $L_1$ is connected via relay contacts 131 (normally not shown in the ladder diagram) and line 134 to the line in which branch function 130 is entered.

More specifically if elements 126, 128 and 130 and 132 are connected in positions, A, B, C, and D, respectively, of circuit line 2, their conditions will govern the energization or deenergization of relay 2. Thus to energize relay 2, relay contacts 126 must be closed, that is relay 3 must be energized. Relay contacts 128 must also be closed, i.e. input relay 512 must be deenergized (push button 50 must not be operated). Or, if relay 103 is energized, relay 2 will be energized via the vertical line 134 of branch function 130, no change ever taking place at position D due to the straight connection 132 specified thereat. When relay 2 is energized, normally open contacts 136 governed thereby will close, providing a positive output signal on the number 1 output terminal 46, thereby energizing lamp 60.

It will be seen that any relay 116 whether output controlling, internally controlled and controlling only, or input controlled may be referenced by any electrical element in positions A, B, C, D of output controlling lines 115 or internal controlled and controlling lines 124. Also, any of the relays 116 may be referenced as many times as necessary by as many different elements as necessary, e.g. a plurality of electrical elements entered throughout the ladder diagram can have their condition controlled by a single relay. Thus inputs, internal logic lines and outputs are all available for use in developing the control logic. Since there is no limitation to the number of times a given relay 116 may be referenced, there is no limitation analogous to the limited number of contacts available on a conventional relay.

Now referring to FIG. 5, an elementary control circuit generally indicated at 138 comprises normally open push button switch 140, normally closed push button switch 142 and normally open limit switch 144 as inputs; two control relays 146 and 148 respectively controlling normally open relay contacts 150 and 152 identified above each by the standard nomenclature used in the art.

This elementary control circuit may be converted by any electrical engineer into a diagram according to the scheme of FIG. 4, as illustrated in FIG. 6. Parallel line or row conductors numbered 1 and 2 are connected between supply lines $L_1$ and $L_2$ to control energization of relays 146 and 148. Normally open contacts 152 are still placed in series with relay 146. The normally open contacts 150 of relay 146 in parallel across push button switch 1 are represented by the branch function 154. Normally open relay contacts 156 in position A of line 1 are governed by the condition of relay 512 connected via one of the respective input terminals 44 to normally open push button switch 140. Normally closed contacts 158 are governed by relay 511 connected by an input terminal 44 to normally closed push button switch 142. Normally open contacts 160 are governed by the condition of relay 510 connected via a terminal 44 to limit switch 144. The external devices connected to the input terminals and thus controlling relays 510–512 are different in FIG. 6 than in FIG. 4.

Relays 146 and 148 may govern external devices by means of their controlled contacts generally indicated at 120 connected to output terminals 46.

By combining normally closed or normally open contacts in a given line of logic a "series" (logical AND) function is formed. If more than four inputs to the series function are required, additional contacts may be placed in a second circuit line and one of the contacts in the first circuit line referenced to the relay in the second circuit line as illustrated in FIG. 7.

The "parallel" (logical OR) function may be specified in two ways. The branch element provides a parallel path. Thus, referring to FIG. 8, if the contacts in line 1 or line 2 are made, then relay 1 is energized. It will be apparent to those skilled in the art that several branches may be specified to develop multiple path parallel (logical OR) functions.

On some occasions, when a large number of items need to be OR'd., it is more efficient to use the technique known as DeMorgan's Theorem. As illustrated in FIG. 9, whenever the relay of line 2 is referenced by a normally closed contact, the condition of elements D, E, F and G is logically OR'd.

Now referring to FIG. 10, information concerning timers is entered in columns C and D. When the FUNCTION thumb wheel 70 (FIG. 2) is turned to T for the timer function, the number entered in column C by means of thumb wheels 72 is the total time to be measured and the number entered in column D which must be composed only of 1's and zeros is the position of the decimal place or 10's multiplier. This total time count is entered in an assigned register in the computer memory and another register is assigned to count internally generated clock pulses. When the two registers are identical the relay of that line (relay 15 in FIG. 10) is energized. The timer only counts when continuity is established through the electrical elements set into columns A and B of that line, for example normally open contacts CR 5 and normally closed contacts CR 17 in positions A and B, respectively, of FIG. 10.

Referring to FIG. 11, information concerning counters is also entered in positions C and D. The total count number is again assigned to an address in memory and another address is reserved for counting the number of times relay CB10, for example, in FIG. 11 is energized. When the two numbers are equal, relay 5 is energized. The counter only counts the number of times the element in FIG. A (CR10) is closed when continuity is established in line 5 through normally closed contacts CR19 in position B.

THE EXECUTIVE PROGRAM

Referring again to FIGS. 4A and 4B, circuit lines 1 through 10 and 101 through 110 of FIG. 4A are lines of logic, each of which has four logical components. Each component, which is also an electrical element is entered in one of the positions A, B, C and D. The components in line 2, for example, are a normally opened switch 126 in position A; a normally closed switch 128 in position B; a branch function 130 in position C; and a line connection 132 in position D. Below each of these electrical elements is a reference number referring to one of the simulated relay coils 116. The condition of a relay coil 116 in group 122 is controllable by an input, such as external devices 50 through 56 of FIG. 4B.

The lines of Group 124 of FIG. 4A are internal and do not directly connect to external devices. These lines are provided for the convenience of the logic designer. The outputs of logic lines 1 through 10 (Group 115), however, are transferred to an external register where through appropriate signal conditioning and amplification external devices 58 through 64 of FIG. 4A are controlled.

Thus, the status of internal relays 503 to 512 are controlled by real world devices such as push button switches, limit switches, pressure switches, and the like. These real world switches monitor and gather information from an external machine or process which the control system is being used to control. These input switches are physically wired to an external register at input terminals 44 and connected to the computer's input-output registers, as indicated in FIG. 3. The status of the inputs is stored in memory locations once during each cycle of the executive program. Similarly, the status of the outputs is stored and read out to external output registers once each cycle. The user of the controller system makes a list or catalog of what external input switches activate each simulated relay coil of group 122 of FIG. 4B and what external device is controlled by each relay coil of group 115 of FIG. 4A in the ladder diagram (FIG. 4).

The general purpose computer runs an internally stored executive program which provides core memory space and an addressing scheme to receive a predetermined number of assembled lines of logic, which comprise the special control program or internal image of the electrical ladder diagram. The special control program is entered into the skeleton logic framework comprising the circuit lines having open positions provided by the executive program as discussed above.

The computer runs the executive program to continually and rapidly examine each line of logic sequentially and stores, updates or otherwise uses the status or condition of the end relay of that line of logic. The executive program also rapidly and sequentially scans the condition of the input terminals and sets the external register 3a (FIG. 3) to the status of the controlling internal relays 116. The executive program further scans the condition of the detachable programming panel 34 to determine whether the user desires to change or add to the logic stored in the allotted positions of the circuit line.

The information coming from the programming panel 34 is loaded into positions in the pre-set logic table organization or internal image of the electrical ladder diagram. The organization of this table as stored in the core memory (not shown) of the computer 32 and corresponding to the logic lines in the ladder diagram of FIG. 4 is shown in FIG. 12A for one circuit line. Each logic line in FIG. 12a corresponds to one 16-bit word in a designated area of core memory in the general purpose computer reserved for storage of the logic or circuit lines. As shown in FIG. 12a, the space designated for storage of the logic lines begins at 1000. Each element entered into a line of logic by the detachable programming panel 34 requires 12 bits of storage space, the first four bits indicating one of the possible functions, i.e., electrical elements, e.g. normally open, normally closed, branch function, straight connection, timer, or counter. Other functions may also be specified in more complicated control systems. When the function is a logic function, i.e. electrical element, the next eight bits contain the reference number for the electrical element. This reference number refers to one of the simulated relay coils 116 in FIG. 4 which controls the condition of the electrical element, as described above. Thus there are 12 bits of information stored for each element in a line of logic, and 48 bits are necessary to enter the four elements comprising a line of logic.

In a small general purpose computer utilizing a 16-bit word memory, three words of that memory are necessary to store the four elements comprising a line of logic. This storage organization is shown in FIG. 12a wherein the locations (words) specified by addresses 1000, 1001, and 1002, store the elements comprising one line of logic. It is not absolutely necessary to store the lines of logic in this "packed" manner, but in a 16-bit machine economies of core space are thereby achieved.

It is apparent from this organization that the number of lines of logic which may be incorporated in any controller is limited only by the amount of memory space available and designated to receive them, while also providing the additional memory space necessary to store the remainder of the executive program and to operate the computer. The organization of the memory space requires that there be a determined number of lines which may or may not be filled.

The main flow chart of the executive program is shown in FIGS. 13A and 13B. Various subroutines of the executive program are shown in FIGS. 14 through 26. The executive program will receive properly conditioned signals from the detachable programming panel 34, and assemble in its internal logic table the specified lines of logic in accordance with the signals so received. The executive program also provides for an output display which communicates to the user which electrical element has been stored in a line and position requested. This display also indicates the status of the line, i.e. whether the relay at the end of the line is energized. The executive program further rapidly and continually updates the condition of the logic specified in each of the logic lines, and resets the lines simulated relay coil in accordance with the results.

The executive program begins at step 0 in FIG. 13A. The preceding first step a in the executive program is to jump to a subroutine (not shown) called "STOREX," wherein the contents of all external registers having input information from either the programming panel 34 or input terminals 44, shown in FIGS. 1 and 3, are stored in internal registers which are designated by the same nomenclature for convenience.

In step 0 it is determined whether or not the detachable programming panel is in use. If it is not, then the program proceeds to step 9 wherein scanning the logic lines is begun as will be described below. If the programming panel is in operation, the program continues as follows.

Referring to step 1 in FIG. 13A, the constant 1000 is loaded into a line pointer (LIN PNT) Register. The constant 1000 is the address of the initial memory location in the sequence of memory locations wherein the logic table or internal representation of the electrical ladder diagram is stored in memory in the specific system. 1003 is the address of the memory location used for the next circuit line of the ladder diagram. The LIN PNT Register stores the first address of the three memory addresses necessary to store one line of logic or circuit line of the ladder diagram, and is to be distinguished from the LIN PNR Register which can store any one of the three lines. This distinction is shown in FIG. 12a. Thus, the LIN PNR Register is incremented three times from 1000 to 1001 to 1002 to 1003 while the LIN PNT Register is incremented once, skipping two numbers from 1000 to 1003 to go from logic line 1 to line 2.

The executive program disclosed herein is for performance on a general purpose computer having an accumulator and controls such that depositing the contents of the accumulator in a specified memory location does not clear the accumulator. After such a deposit operation, the information may be found both in the location where it was deposited and in the accumulator from which it was deposited.

The next step in the executive program is to isolate information relating to the condition of position selection switches A, B, C, and D on the detachable programming panel 34 (FIG. 2), and to store that information for later use.

The switches A, B, C and D are connected through switch filters to the first four terminals of external register 1 (FIG. 3) and therefore the contents of that external register as stored in memory are loaded into the accumulator. This is indicated in step 2 of FIG. 13A. The high order four bits of the contents of the accumulator now refer to the conditions of switches A, B, C and D on the detachable programming panel 34, and the other twelve bits of information from external register 1 present in the accumulator are not needed at this time. These twelve bits are removed by rotating the accumulator twelve positions to the right to place A, B, C, D in the low order four bits thereof, which is accomplished by a simple subroutine not shown, entitled "Rotate Twelve Right," the performance of which is indicated in step 3 of FIG. 13A. The low order four bits of the accumulator are then stripped off by a logical AND operation with the contents of the accumulator and the octal number 017. This operation is indicated in step 4, of FIG. 13A. The "P" designates an "immediate positive" operation, and thus the octal number 017 is used in the operation rather than the contents of a memory location addressed by octal 017. The information remaining in the accumulator indicates the condition of switches A, B, C and D, and is stored in a memory location ABCD as indicated in step 5 of the flow chart.

One of the advantages of the detachable programming panel as described herein is that the operator receives a display of the electrical element and reference number that have been programmed in one of the positions A, B, C or D in a line of logic. This display is provided by the output subroutine shown in FIG. 17.

Referring to FIG. 17, the first step of the output subroutine is to locate the line of logic that contains the element to be displayed on the readout section 80 of the detachable programming panel 34 (FIG. 2). This line was specified by the user when he set the LINE NUMBER thumb wheels 68 indicating a line number on the programming panel face 66, and this information was read into the memory from external register 1 to which LINE NUMBER thumb wheels 68 are connected as shown in FIG. 3. Therefore, step 1 of the output subroutine calls for loading the stored contents of external register 1 into the accumulator. As before, all 16 bits stored in external register 1 are loaded into the accumulator; however, the information specifying the line number to be examined is found in the low order 12 bits thereof. In order to discard the other four bits of information in the accumulator, a logical AND operation is performed with a mask which is octal number 7777. For internal efficiency, the information is then converted into binary form from the binary coded decimal form in which it was presented to and read into the computer. These operations are indicated in step 1 of the Output Subroutine of FIG. 17. Step 2 of the subroutine is the performance of two other subroutines. The first of these is "Line Address" (LINADR) which converts the line number information to the actual address of the line in the organizational scheme of the computer's memory, and loads the actual address in the Line Pointer (LINPNR) Register. This subroutine is shown in FIG. 18.

Now referring to FIG. 18, step 1 of the subroutine multiplies the line number from the ladder diagram, by three, because the organization scheme requires three words per line, and the first words of each line are separated by increments of three. Step 2 thereof is the addition of octal 1000 in accordance with the address organization of FIG. 12A, wherein the line addresses begin at 1000 within the memory. Step 2 is completed by storing the actual address in the Line Pointer (LINPNR) Register.

Figure 14:
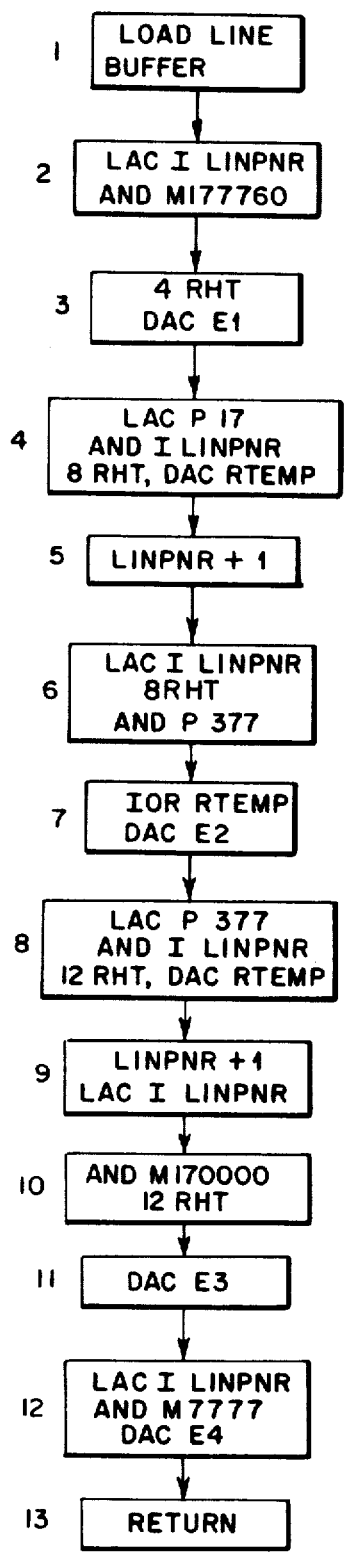

The second subroutine of step 2 of FIG. 17 is entitled "Load Line Buffer," and is illustrated in FIG. 14. Referring to FIG. 14, this subroutine is used to expand a logic line from its three computer word storage form into four computer words, each word containing one of elements A, B, C or D and four vacant high order bits. This makes it convenient to work with any of the individual elements. In order to accomplish this, a Line Buffer Register is established in four memory locations, and the Load Line Buffer Subroutine "unpacks" the information from the three word form of FIG. 12a and loads it in the Line Buffer in the four word form illustrated in FIG. 12b, wherein "X's" and "O's" symbolically illustrate the two states of the stored bits.

The load line buffer subroutine shown in FIG. 14 first loads into the accumulator the contents of the line pointer register (LINPNR) which is the register specifying one of the three words comprising a line of logic being examined. In this initial step the LINPNR contains the first of the three words comprising a complete line of logic. A logical AND is performed with an octal mask 177760 to strip off the function code and reference number for element A. The accumulator is rotated four right in step 3 of the subroutine to place the information in the low order 12 bits. It is then deposited in line E1 of the Line Buffer Register, and that line now contains all information relating to element A as well as four high order unoccupied bits where further information concerning element A may be stored or recorded as desired. The remainder of the Load Line Buffer Subroutine performs a similar operation for the other three elements of the line of logic being stored in the Line Buffer, storing the information for elements B, C and D in lines $E_2$, $E_3$, and $E_4$ of the Line Buffer Register by means of masking, rotation, and logical operations which will be apparent to one skilled in the art from the flow chart of FIG. 14.

The first instruction in the next step of the Output Subroutine, step 3 of FIG. 17, is a jump to another subroutine entitled "Adjust Address." This subroutine is shown in FIG. 19. Referring to FIG. 19, the subroutine examines the information stored in locations A, B, C and D corresponding to the condition of switches A, B, C and D on the programming panel to determine which one of the four positions in the specified logic line the programmer has called for, i.e. which button 74 is depressed. An address must be obtained to point to one of the lines $E_1$, $E_2$, $E_3$, or $E_4$ of the Line Buffer containing the function code and reference number to be displayed. The address adjust subroutine uses a series of "skip if different" and "addition" instructions to determine which button the operator has depressed. By adding the number corresponding to the position of the A, B, C or D push button in the row on the programming panel to the initial address of the Line Buffer, $E_1$ADR the proper E address for the element is obtained.

This address is deposited in a location entitled "E Address (EADR)," which points to one of four lines in the line buffer register. That completes the Address Adjust subroutine, and the Output Subroutine (FIG. 17) continues by loading contents of the line E specified by the EADR obtained into the accumulator, which contents are the function code and reference number information for the element stored in the position the operator has called for. An octal mask 377 is performed to isolate the information relating to the reference number. This information, after conversion from binary to Binary Coded Decimal, is stored in a location called EX1a for readout to the External Register 1a at the readout step of the program. An OR with the content of ABCD indicates which position lamp 75 (FIG. 3) to light, and this information is also stored for readout.

The function of the element will also be displayed on the programming panel, and this procedure beings in step 5 of the Output Subroutine. The contents of the line of the Line Buffer Containing the information relating to the element are loaded into the accumulator. The four bits containing the function code are stripped off by a logical AND operation with an octal mask 7400. It is next desired to determine which one of the functions is specified by the function code and to do so a jump to a subroutine illustrated in FIG. 21 entitled "1 of 6" is executed.

Referring to FIG. 21, the "1 of 6" Subroutine relates the function code to one of the six function buttons located on the panel. The information remaining in the accumulator is rotated eight positions to the right to put it in the low order four bits. The accumulator is incremented and stored in an R-Count Register. The accumulator is loaded with octal number to put a 1 in the high order bit. The R-Count Register is then decremented until it equals zero, and the accumulator rotated one right each time it does not equal zero. This in effect, moves the introduced high order bit down the word, and it will stop in a position corresponding to the lamp for the function display.

The results of the "1 of 6" subroutine are deposited in a general storage register R1 as indicated in step 6 of the Output Subroutine of FIG. 17. The next step is a jump to a subroutine labeled "Test." This subroutine will examine the state of the line the operator has called for to determine whether or not it is active, or conducting, and provide that information for transmission to the display labeled Output on the programming panel.

The test subroutine is illustrated in the flow chart of FIG. 24. It places one bit, either a 1 or a 0, in the accumulator, to indicate the status of the line. This result of the test subroutine is rotated 1 bit to the left in preparation for the operations specified in step 7 of FIG. 17, the Output Subroutine. The test subroutine is described more fully below.

The first instruction in step 7 is to remove everything from the accumulator except for the status bit which we obtained in step 7, this being accomplished by an AND with 001. An inclusive OR operation is performed between the contents of register R1, which contained the result of the "1 of 6" Subroutine, the accumulator containing the status bit, leaving in the accumulator the combined information of the status of the line and the 1 of 6 display. This information is stored in the EX2A Register for transmission to External Register 2A, thereby showing to the operator of the programming panel the reference number and function of the element stored in the position he has specified. Step 8 of the Output subroutine of FIG. 17 terminates the subroutine, and specifies a return to the executive program of FIG. 13A.

At step 7 of the executive program the information from external register 3 is loaded into the accumulator. The contents of this register contains, along with other information, the status of the enter push button bit located on the programming panel, and the status is checked in decision step 8 of the program. If this bit is positive, indicating that the programmer desires to enter new information, the executive program jumps to a subroutine entitled "Input," illustrated in FIG. 16.

Referring to FIG. 16, the Input Subroutine is in many respects similar to the Output Subroutine discussed above. Step 1 of the Input Subroutine indicates loading of the information from external register 1 into the accumulator, and stripping off the low order 12 bits, thereby leaving the information from the line number thumb wheels in the accumulator. This is converted from binary coded decimal to binary for internal efficiency by a jump to a BINBCD Subroutine (not shown). Step 2 of the Input Subroutine is a jump to the Line Address Subroutine to transform the line number information from the LINE NUMBER thumb wheels 68 to the external addressing scheme, and upon return a jump to the load line buffer subroutine and return. These subroutines and operations have been described above in the Output Subroutine discussion, as has the Address Adjust Subroutine, a jump to which is indicated in step 3, of FIG. 16.

The general operation of the Input Subroutine is to enter the information the programmer has indicated on the function thumb wheels and reference number thumb wheels in the specified element position in a line of logic. The next step therefore is to load into the accumulator the information from external register 2. The information corresponding to the reference number will be handled first, and therefore the 12 bits of information (3BCD coded decimal digits) is stripped off by the logical AND operation with an octal mask 7777 indicated in step 3 of FIG. 16.

In step 4 this information is converted to binary and deposited for temporary storage in the register R1. The information from external register 2 is again loaded into the accumulator, and the high order four bits which contain the function code for the element are stripped off for examination. These are then rotated to the right to get them into the desired position, and an inclusive OR operation is performed with the contents of register 1, containing the reference number information. A 12-bit word comprised of four bits of function code and an eight bit reference number for the particular element being put into the line of logic is obtained. This 12-bit word, with four blank bits, is deposited in the E Address, or line buffer address obtained earlier in the jump to the Address Adjust Subroutine.

At this point in the Input Subroutine the information the operator desired to enter has been deposited in the line as stored in the Line Buffer. It is necessary to read the information from the Line Buffer into the permanent line storage positions. To do this, the line address obtained above in the Line Address Subroutine is placed into a Line Pointer Register (LINPNT) and a jump to a subroutine called Store Line Buffer is performed. This subroutine will convert the four line buffer registers into the three lines necessary for efficient storage, according to the scheme of FIG. 12a, and put them in their proper location in the stored logic table.

Figure 15:
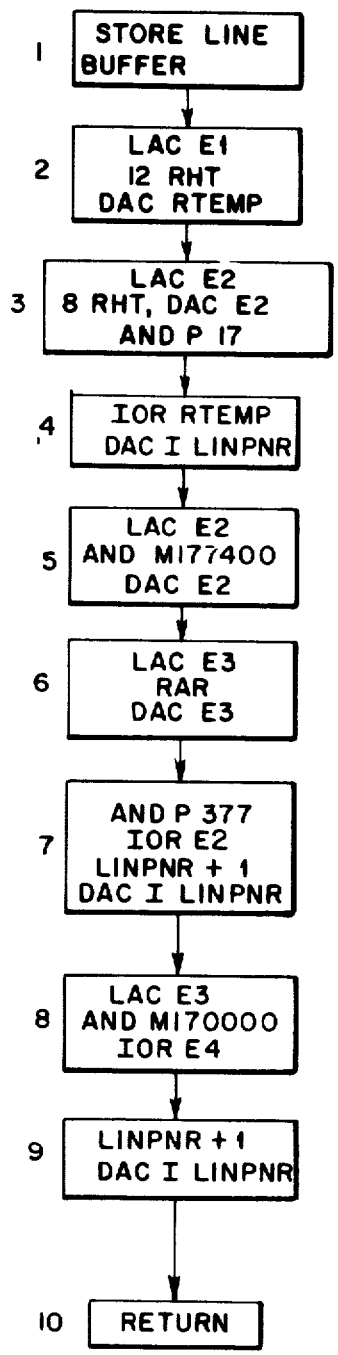

The Store Line Buffer subroutine is illustrated in the flow chart of FIG. 15. In step 2 the accumulator is loaded with the first line $E_1$ of the Line Buffer Register, and the accumulator is rotated right to place the 12 information bits for element A in the high order 12 bits thereof. This word is deposited into a temporary register RTEMP. The accumulator is then loaded with the contents of the second line $E_2$ of the Line Buffer containing the function code and reference number for element B. A rotation eight right, indicated in step 3, of FIG. 15, places the four function code bits of element B in the low order four bits of the accumulator. After restoring the contents of $E_2$ in the Line Buffer so that the reference number information is not lost, the four function code bits for element B are stripped off by an AND operation with octal number 17. Step 4 indicates an OR operation with the contents of RTEMP, which results in the desired 16 bits of information ready to be stored in the internal logic table storage. Similar Rotations, Masking, and OR operations are performed to store the remaining information from the Line Buffer, as will be understood by one skilled in the art inspecting the flow chart of FIG. 15.

The input subroutine concludes with a jump to the output subroutine so that the operator may be presented with a display of what is entered and immediately check the correctness thereof. At this point, the executive program continues with step 9 (FIG. 13A). It should be noted that if the enter button is not depressed, the program goes immediately to step 9, which begins the actual performance of logic designated by the control program.

The general method by which the executive program performs the function of the ladder diagram entered into the logic table by the operator is to scan through the elements of each line and upon completion of scanning these elements set the simulated relay located at the end of the line to either a one or zero value depending on the status of the elements. This is done for each line of logic in the table. In the case of the lines of logic connected to the output terminals, there is a real world manifestation of the status of the line of logic in the form of an available output from the controller system. In the case of an internal line of logic the reference number (status bit) is set to one or zero for use in conditioning electrical elements of other lines of logic.

The flow chart of the executive program begins this operation in step 9 of FIG. 13A, wherein the contents of the Line Pointer Register (LINPNT) which holds the address of the first stored line of logic is loaded into the Line Pointer Register (LINPNR). The second line pointer register is used to specify one of the three 16-bit storage words necessary to store one complete line of logic according to the organization of FIG. 12a. The other Line Pointer Register (LINPNT) keeps track of which entire logic line is being referred to at any given time.

Step 10 comprises a jump to the Load Line Buffer Subroutine, wherein the first line of logic is loaded into the Line Buffer as described above.

In step 11 of the executive program (FIG. 13A), an E Pointer Register (EPNT) is loaded with an E start (ESTRT) address. The E Pointer Register contains the information consisting of which line E1, E2, E3 or E4 of the Line Buffer Register is being examined at a particular time. The E start address loaded therein is the address of the first line in the line buffer register, E1. In step 12 the contents of the E Pointer Register are loaded into the accumulator and the low order eight bits are stripped off by an AND operation with an Octal Mask 377. These bits are the reference number of the element under consideration. These eight bits are deposited into a register called the Reference Register (REFREG), which operation is referred to in step 13. As it is also necessary to look at the function code of the element under consideration, the contents of line $E_1$ of the Line Buffer are again loaded into the accumulator, and rotation to the right is performed in order to place the function code in the low order four bits of the accumulator. The low order four bits are stripped off by the logical AND operation of step 15, leaving only the four bit function code in the accumulator. This four bit function code is deposited in a register called the Function Register (FUNC).

Step 16 indicates a jump to a subroutine called a Bit Location which beings with Step 1 in FIG. 22. The Bit Register Subroutine is used to determine the location of the single bit which contains the status information of an element specified by the reference number.

The reference number contains the address of this information, and the reference number must be transformed into a word number and bit location to isolate the desired bit. According to the scheme set up for storing the status bits indicating the status of the simulated relays, there are several 16-bit words comprising a Word Buffer. Each numbered word in the Word Buffer stores 16 Status Bits and each Status Bit has a Bit Number. The Word Number and Bit Number have an established relation to the Reference Number of a given element, such that to determine the word number and bit number specifying a given bit location, the reference number is divided by 16. The quotient of this division is the word number indicating one of the words comprising the Word Buffer; the remainder of this division is the bit number.

Referring specifically to the Bit Location Subroutine (FIG. 22) in Step 2, zero is loaded into the Word Number Register (WDNO) to clear it. In Step 3 the reference number register (REFREG), which contains the reference number for the input being considered, is loaded into the accumulator. In Step 4 the accumulator is loaded into the Bit Number Register (BITNO). At this stage the Bit Number register may not contain the desired bit number accurately. In Step 5, 16 is subtracted from the accumulator and in Step 6, the accumulator is examined to see whether it is less than zero. If it is not less than zero, the division operation just performed was valid and might be performed again. The Word Number Register is incremented by one to indicate this division and the subroutine returns to Step 4 wherein the new contents of the accumulator are loaded into Bit Number Register. It should be noted that when the accumulator is reduced to less than zero after one of the subtractions, the desired bit number will have been deposited in the Bit Number Register in Step 4. This iterative loop is continued until the accumulator is negative, at which time the proper Word Number and Bit Number are contained in their respective registers, and there is a return to the executive program.

Upon return from the Bit Location Subroutine, the executive program continues as shown in FIG. 13B. Step 17 of FIG. 13A and Step 0 of FIG. 13B are the same, and indicate the transition between the two Figures.

After the bit location subroutine, Step 1 (FIG. 13B) in the executive program comprises a jump to the Bit Mask Generator Subroutine shown in FIG. 20. Performance of this subroutine will generate a mask that will blot out all bits in a word except one. This bit mask is constructed with the contents of the Bit Number Register. When an AND operation between the Bit Mask and the Word in the Word Buffer is performed, there is isolated the one bit indicating the status of the referenced simulated relay.

To generate this Bit Mask, Step 2 of FIG. 23 comprises incrementing the contents of the Bit Number by one and depositing the result in a counter Register (CNTR). The number 1 is then loaded into low order or zero position of the accumulator in Step 2 of this subroutine. If the counter minus 1 equals zero, then the current contents of the accumulator comprises the desired bit mask and is deposited in the Bit Mask Register (BITMSK). If the contents of the counter minus 1 are not equal to zero then the accumulator is rotated 1 right. The operation is repeated until the desired bit mask has been stored in the Bit Mask Register, at which time Step 3b of FIG. 23 provides a return to the executive program.

Step 2 of FIG. 13B of the executive program specifies a jump to a subroutine entitled "Test," which subroutine is found in FIG. 24. The Step 2 of the Test subroutine adds twenty to the word number obtained in the Bit Location Subroutine in order that the desired word in the Word Buffer is pointed to by the Word Register (WORD). The constant added may vary depending on the locations in memory wherein the Word Buffer is stored. The accumulator is then loaded with the contents of the Word Register, and the logical AND operation with the bit mask generated in the previous subroutine is performed, leaving a single bit in the accumulator. This bit is either a "1" or a "0," and it indicates the state of the input or output device being "tested." The results of this test are stored as a "1" or a "0" in a Flag Register (FLAG) as indicated in steps 4, 4a and 5 of the Test Subroutine in FIG. 24.

In Step 3, the contents of the function register are placed in the accumulator. The contents of the function register are placed in the accumulator. The contents of the function register are four bits identifying the function of the element being examined. In Step 4 a decision is made whether or not the function is function 0, which is the normally open switch contact. If it is not, the program proceeds to box 5 wherein a test of whether or not the function is the second possible function, a normally closed switch. The testing proceeds in like manner through the four available logical inputs. Timers and Counters are a special case which will be described below. Returning now to Step 4 wherein the test for a normally open contact is performed, if the result of this test is "yes," then the program proceeds to set a status bit $S_n$ recording whether or not the actual condition found at the input terminal is equal to the normal condition of that logic element. To do this the contents of the Flag Register obtained as described above, are loaded into the accumulator, and a decision made concerning the status of the flag. In order for the function of a normally open switch to be conducting, that flag bit must be 1. Therefore if it is equal to 1, this fact will be recorded for this element by a procedure specified in the subroutine Set $S_n$. The Set $S_n$ Subroutine is shown in FIG. 20. It comprises loading the accumulator with the contents of the E pointer register for the element 1,2,3 or 4 of a line of logic which is presently being examined, and performing a logical OR operation between the contents of the EPNT and octal 100,000 to set the vacant high order bit equal to 1. The contents of the EPNR Register with the status bit set are then returned, to that register to conclude the Set $S_n$ Subroutine.

If the Flag Register is not equal to 1 then the executive program continues at B2 (FIG. 13B).

In a similar manner, if the function is a normally closed contact, i.e. the results of decision Step 5 "yes" (FIG. 13B) then the flag is loaded into the accumulator and a decision made whether or not the logical condition specified has been met. In the case of a normally closed contact, the flag register will contain a zero if the logical condition has been met and there is a jump to the Set $S_n$ Subroutine as indicated in Steps 5a, 5b and 4c of FIG. 13B.

If the function is the third possible function, the branch function, a similar test is performed. If the branch is conducting, then to set the status bit for that branch, the status bits of all preceding elements in that branch are forced to 1. This is accomplished by first storing the E pointer in a Save Location (Step 6c) and then loading E Start into the E Pointer Register. This E Start is the first element in the line being examined, and its status bit is set to 1 by a jump to the Set $S_n$ Subroutine. If the E Pointer does not equal the original E pointer stored in the Save Location, the E pointer is incremented, and another jump to Set $S_n$ is performed to set the status bit of the next element. This is continued until all elements preceding the branch function in the line have had their status set bit forced to 1. At this time the contents of the Save Location Register are redeposited in the E pointer register and the executive program continued at B2.

In the case of the fourth possible logical element, a straight connection, there is immediately a jump to the $S_n$ subroutine, as this element always conducts. In other words there is no logical function to check.

The portion of the executive program before the circled B2 (FIG. 13B) has taken a specified element in the position A,B, C or D in a line of logic and tested it to see whether it's logically true, and set a status bit for that element to either a one or a zero.

Immediately following the circled B2, a decision Step 9 indicates whether or not the end of that line of logic has been reached, that is whether the status of each element in the line has been determined and set. If it has not, the E Pointer Register specifying one of the four elements stored in the Line Buffer, is incremented by one so that it points to the next element in the line. This operation is indicated in Step 10, FIG. 13B. The program then returns to box 12, column A and again performs the operation of checking and setting the status bit for the next element in the line of logic as described above.

If one line of logic has been completed, it is then desirable to set the status bit of that entire line of logic. This operation is carried out in the portion of the executive program extending to the right of decision Step 9. The first step in setting the status bit of an entire line is to load the first element of that line into the accumulator and to check the status bit of that element. This operation is indicated in Steps 9a and 9b of FIG. 13B, and the status bit is checked in decision box 9c. If the status bit is a one, the program continues to the next decision Step 9d to determine whether or not the end of the line of logic has been reached, the "end" occuring when all status bits have been checked.

When all elements of a line have not been checked, the E Pointer is incremented by one in Step 8a in order to check the next element in the line, and the status bit of that next element is then checked in boxes 9b and 9c. If the end of a line is reached with all elements in that line having a status bit of one, then the program proceeds to Steps 10d, 11d, and 12d which operations produce a word number, bit number and bit mask for the status bit simulating the relay contact for the line of logic. These operations comprise subroutines described above. Step 13d of FIG. 13B instructs a jump to the Set Subroutine of FIG. 25, wherein the first step comprises loading the accumulator with the line pointer specifying which line of logic has been examined. A constant is subtracted from the line pointer because the information concerning the status of the line is stored in a different register which is always a constant distance away from the Line Pointer. At that fixed given distance away is the Word Buffer. A logical OR operation with this bit mask sets the desired bit to a "one" while preserving the other bits of the Word in their previous states, and the Word so modified is then deposited back in the Word Buffer.

If at any time the result of the decision Step 9c of FIG. 13B is negative, indicating that the status of one element in a line does not equal one, there is again produced a Word Number, Bit Number and Bit Mask for the Status bit of the line being examined (See Steps 10b, 11b and 12b of FIG. 13B). There is then a jump to the Clear Subroutine, which subroutine is found in FIG. 26. The Clear subroutine is similar to the Set Subroutine described above except that the Bit Mask is complemented and a logical AND operation performed between the complemented bit mask and the word containing the status bit for the line. This operation sets the status bit equal to a zero for that line, and the word is again returned to its storage position. It should be recognized that when the status of an external line of logic is being set, the status of the bit corresponding to that output terminal is also changed for subsequent transmission to an external output terminal.

To complete the executive program, the line pointer is loaded into the accumulator in step 10c of FIG. 13B and in decision Step 11c a decision is made as to whether or not all lines of logic have been examined. If they have not, then the line pointer is incremented by three as indicated in step 12c and it points to the next complete line of logic in the internal logic table. The program then returns to circled "C" near Step 9 of FIG. 13A and performs the logic of the next line of the table.

This continues until all lines of logic have been examined and their status bits set. If the last line of logic has been checked, then Step 13c of the executive program indicates a readout to the external registers, thereby displaying display information and updating the conditions of the output terminals.

The executive program then returns itself to the start position of FIG. 13A and begins again.

Timer subroutines are not disclosed in detail. Basically a memory location is used to store the user chosen set time. The set time is compared, when the line containing the timer is incremented in the executive program, with another memory location containing the elapsed time. When they are equal the line status bit is set to one. Elapsed time may be updated once each program cycle in accordance with the number of master clock cycles occuring during the last program cycle or each clock cycle may initiate a flag to interrupt the program and immediately update all elapsed times by 1. Only the elapsed times of timers in lines wherein the status of A and B indicate energization are incremented. To this end a status bit corresponding to the ordinary line status bit (positions C and D are treated as direct connections) may be stored in the same address as the elapsed time. Provision is also made to set the elapsed time to zero if the timer status bit is zero, i.e. reset the timer. Obviously many other programming schemes are possible and other kinds of timers may also be simulated by a skilled programmer.

Counter subroutines are similar. Continuity from positions A and B set a counter status bit to one to count. Provision is made to store the last status of the line whose cycles are to be counted. Once each program cycle, if the referenced status has changed and the counter status bit is one the elapsed count is incremented by one. When the elapsed count is equal to the user set count the counter line status bit is set to one. The elapsed count is reset to zero whenever continuity from A and B is discontinued. This and other types of counters can also be simulated in many ways according to the scheme of the invention by skilled programmers.

REMOTE SERVICING OF THE COMPUTER CONTROLLER

An important feature of the invention is remote servicing of the computer controller 32 as illustrated in FIG. 27. Provision is made for plugging an acoustic coupler 162 into the computer 32 via cable 164 and connector 166. The acoustic coupler 162 connects to appropriate external input and output registers similar to external registers 1, 2, 3, 4, 1a, 2a and 3a shown in FIG. 3. The signals on these registers are communicated to and from a remote service center, generally indicated at 168 via a local telephone station set, generally indicated at 170, central station telephone station set, generally indicated at 172, and voice grade telephone line 174.

Central station 168 comprises a small general purpose digital computer 176, a control panel 35, various signal conditioning and power supply circuits mounted in rack 180 and a teletypewriter 182. The teletypewriter 182 has associated therewith a paper tape reader and punch, generally indicated at 184.

The central station 168 is also provided with an acoustic coupler 186 which connects the computer 176 to the service center's station set 172.

The acoustic couplers 162 and 186 shown are Anderson Jacobson's Model ADC-300. The teletypewriter 182 having a standard keyboard 183, and the associated paper tape reader and punch 184 together are Teletype Corporation's ASR-33 Model. The second small general purpose digital computer 176 may also be a Digital Equipment Corporation PDP-8/L.

The central station 168 may call for printing out either by the teletypewriter 182 or by punch 184 of the executive or control programs of the remote computer controller 32. Similarly, the central station 168 can read in to the remote computer controller 32 an executive or a control program from the paper tape reader 184 or from the teletypewriter 182. The control panel 35 at the central station also can be used to read in or read out a control program (information inserted into the ladder diagram) from the remote computer controller 32. For diagnostic purposes the central station 168 can request a readout of the contents of any memory location of the remote computer controller 32 and can similarly read in new contents into any memory location in the remote computer controller 32.

A special function performed by the service center 168 is that a special control program stored in the remote computer controller 32 by means of a control panel 34 which had been connected thereto by the industrial engineer may be printed out by the teletypewriter 182 in the format illustrated in FIG. 4. This is done by a standard keyboard 183 under the control of computer 178 to print out the special symbols of FIGS. 4a through 4d or by providing specially selected or assigned symbol keys in the teletypewriter 182.

It will thus be seen that the objects set forth above, among those made apparent from the preceding description, are efficiently attained and, since certain changes may be made in practicing the disclosed method and in the apparatus and system set forth without departing from the scope of the invention, it is intended that all matter contained in the description or shown in the accompanying drawings shall be interpreted as illustrative and not in a limiting sense.

Particularly, it will be understood that additional functional modules may be provided in the executive program in addition to relay logic, timers and counters for example sequences (programmers), servo loops, interpolation, position and velocity control. Places would thus be reserved in an iterative control diagram like FIG. 4 for specifying each of such elements and their respective parameters.

It is also to be understood that the following claims are intended to cover all of the generic and specific features of the invention which, as a matter of language, might be said to fall therebetween. Particularly, it is understood that in said claims, elements or steps recited in the singular are intended to include compatible combinations of equivalent elements or steps whenever the sense permits.

Having described the invention what is claimed as new and desired to secure by Letters Patent is:

1. A programming panel for programming a computer controller to perform control functions, the computer controller having stored therein an executive program for communicating with the programming panel and for simulating an electrical ladder-type control circuit having a plurality of circuit lines, a plurality of spaces in each circuit line, each space providing for the inclusion of one type of a plurality of types of electrical elements comprising elements the condition of which is a function of a referenced condition, and each of said circuit lines further providing circuit line condition specifying means controlled in accordance with the electrical condition of its respective circuit line or an external input controlling a line, at least some of said condition specifying means controlling outputs, the executive program simulating specified ones of the plurality of electrical elements in specified spaces to complete a simulated control circuit, said programming panel comprising in combination:

A. manually operable means for specifying to the computer controller one of a plurality of circuit lines of the simulated ladder-type control circuit;

B. manually operable means for specifying to the computer controller one type of the plurality of types of electrical elements;

C. manually operable means for specifying to the computer controller a reference to the circuit line condition specifying means in the simulated ladder-type control circuit which is to control the condition of the said specified type of electrical element; and D. manually operable means for specifying to the computer controller one of the spaces in the specified circuit line of the simulated ladder-type control circuit into which the specified type of electrical element is to be entered.

2. A programming panel as defined in claim 1, further comprising:

A. readout means for indicating which type of electrical element has been entered in a specified space in a circuit line;

B. readout means for indicating in which space in the specified circuit line of the simulated ladder-type control circuit the specified type of electrical element has been entered; and, C. readout means for indicating to what condition the electrical element entered in the specified space in the specified line is referenced.

3. A programming panel as defined in claim 1 wherein said plurality of types of electrical elements specifiable by said manually operable means comprise normally open and normally closed switches, and wherein said manually operable means for specifying to the computer controller one type of the plurality of types of electrical elements comprises:

1. a first switch mounted on the programming panel for specifying a normally open switch; and 2. a second switch mounted on the programming panel for specifying a normally closed switch.

4. A programming panel as defined in claim 3, wherein said plurality of types of electrical elements further comprise an electrical branch function, and wherein said manually operable means for specifying to the computer controller one type of the plurality of types of electrical elements further comprises:

3. a third switch mounted on the programming panel for specifying an electrical branch function.

5. A programming panel as defined in claim 3, wherein said plurality of types of electrical elements comprise timers, and wherein said manually operable means for specifying to the computer controller one type of plurality of types of electrical elements further comprises:

3. a third switch mounted on the programming panel for specifying timers.

6. A programming panel as defined in claim 3, wherein said plurality of types of electrical elements comprise counters, and wherein said manually operable means for specifying to the computer controller one type of plurality of types of electrical elements further comprises:

3. a third switch mounted on the programming panel for specifying counters.

7. A programming panel as defined in claim 3 wherein said plurality of types of electrical elements comprise electrical continuity, and wherein said manually operable means for specifying to the computer controller one type of a plurality of types of electrical elements further comprises:

3. a third switch mounted on the programming panel for specifying an electrical continuity.

8. A programming panel as defined in claim 1, wherein there is provided the same predetermined fixed number of spaces in each circuit line of the simulated ladder type control circuit, each space providing for the inclusion one electrical element, and wherein said manually operable means for specifying to the computer controller one of the spaces in a specified circuit line comprises a plurality of switches mounted on the programming panel, each of said switches corresponding to one of the predetermined fixed number of spaces.

9. A programming panel as defined in claim 1 wherein said plurality of types of electrical elements specifiable by said manually operable means comprise an electrical branch function, and wherein said manually operable means for specifying to the computer controller one type of the plurality of types of electrical elements comprises:

1. a first switch mounted on the programming panel for specifying an electrical branch function.

10. A programming panel as defined in claim 9 wherein said plurality of types of electrical elements specifiable by said manually operable means comprise electrical continuity, and wherein said manually operable means for specifying to the computer controller one type of the plurality of types of electrical elements further comprises:

2. a second switch mounted on the programming panel for specifying an electrical continuity.

11. A programming panel as defined in claim 1, wherein said plurality of types of electrical elements specifiable by said manually operable means comprise timers, and wherein said manually operable means for specifying to the computer controller one type of plurality of types of electrical elements comprises:

1. a first switch mounted on the programming panel for specifying a timer.

12. A programming panel as defined in claim 11 wherein said reference specifying means comprises a numeric input means and said programming panel comprises further means for specifying the timer interval as the numeric value of said reference specifying means when a timer is specified in a first space in a circuit line of the simulated ladder-type control circuit.

13. A programming panel as defined in claim 12, wherein said programming panel comprises further means for specifying a timer multiplier for said timer interval as the numeric value of said reference specifying means when a second space, in the same circuit line of the simulated ladder-type control circuit is specified.

14. A programming panel as defined in claim 1, wherein said plurality of types of electrical elements specifiable by said manually operable means comprise counters, and wherein said manually operable means for specifying one type of the plurality of types of electrical elements further comprises:

1. one switch mounted on the programming panel for specifying a counter.

15. A programming panel as defined in claim 14, wherein said reference specifying means comprises a numeric input means and said programming panel comprises further means for specifying the total count as the numeric value of said reference specifying means when a counter is specified in a first specified space in a circuit line of the simulated ladder-type control circuit.

16. A programming panel as defined in claim 15, wherein said programming panel comprises further means for specifying the condition whose changes are to be counted as the numeric value of said reference specifying means when a counter is specified in a second specified space in a circuit line of the simulated ladder-type control circuit.

17. A programming panel as defined in claim 1, wherein each circuit line condition specifying means in the simulated ladder-type control circuit is numbered and wherein said manually operable means for specifying to the computer controller a reference to one of the plurality of circuit line condition specifying means comprises a manually settable numeric input.

18. A programming panel as defined in claim 17 wherein said circuit lines are numbered identically with said circuit line condition specifying means, and wherein said manually operable means for specifying to the computer one of a plurality of circuit lines of the simulated ladder-type control circuit comprises a manually settable numeric input.

19. A programming panel as defined in claim 1 wherein said circuit lines are numbered and wherein said manually operable means for specifying to the computer one of a plurality of circuit lines comprises a manually settable numeric input.

20. A computer controller system for controlling machines of the type controllable by sequenced opening and closing of electrical switches forming a portion of a machine control circuit, the system comprising:

A. a computer programmed to simulate a conventional ladder diagram electrical circuit format of the type having a plurality of circuit lines, each circuit line terminating in a relay conditioned by the conducting status of the circuit line, each circuit line providing spaces therein wherein the computer is programmed to simulate specified ones of a plurality of types of electrical elements completing a machine control circuit comprising switches the condition of which may be specified to be controlled by a specified one of said relays;

B. a programming panel for programming a particular machine control circuit into the computer, the programming panel comprising:

a. means for specifying to the computer one of the plurality of circuit lines of the conventional ladder diagram, b. means for specifying to the computer one type of the plurality of types of electrical elements, c. means for specifying to the computer the relay which is to control a specified electrical element, d. means for specifying to the computer one of the spaces in the specified circuit line wherein the specified electrical element is to be simulated.

21. A computer controller system as defined in claim 20 wherein the conventional ladder diagram electrical circuit format has a fixed plurality of numbered circuit lines, and wherein the means for specifying to the computer one of the plurality of circuit lines comprises a manually settable numeric input.

22. A computer controller system as defined in claim 20, wherein each circuit line of the conventional ladder diagram electrical circuit format has an equal number of fixed spaces therein, and the means for specifying to the computer one of the spaces in a specified circuit line comprises an equal number of switches, each switch corresponding to one of the fixed number of spaces.

23. A computer controller system as defined in claim 20 wherein the means for specifying to the computer the type of electrical element comprises a single key for each type of electrical element.

24. A computer controller system as defined in claim 20 wherein the means for specifying to the computer the relay which is to control a specified switch comprises a manually settable numeric input.

25. A computer controller system as defined in claim 20 wherein said computer is programmed to also simulate as one of said types of electrical elements an electrical branch function the energization of which may be controlled by a specified one of said relays and said programming panel comprises a switch for selecting said branch function.

26. A control method comprising:

A. simulating a portion of a control system in a computer, the control system comprising control elements the condition of which is governed by the condition of other control elements or conditions;

B. repetitively updating the condition of selected control elements or conditions in accordance with specified input conditions to the computer, C. repetitively updating all elements of the simulate control system in accordance with their respective governing conditions;

D. repetitively updating the condition of specified output conditions of the computer in accordance with the conditions of specified control elements and conditions; and, E. while performing the above steps, altering the simulated control system by specifying to the computer a position in the simulated control system, the type of control element to be substituted therein, and the condition which is to govern the condition of the substituted control element.

27. The method defined in claim 26 wherein the last named step is accomplished by:

1. dedicating a plurality of input registers of the computer for accepting information from a programming panel, one of said plurality of dedicated input registers accepting information specifying a position in the control system, another of said plurality of dedicated input registers accepting information specifying a type of control element to be placed at a specified position, and another of said plurality of dedicated input registers accepting information specifying the condition which is to govern the condition of the specified control element.

28. Control method as defined in claim 26 and further comprising:
   A. transmitting data comprising at least a portion of the simulated control system from the digital computer to a second computer, said portion comprising at least the type of control elements of the simulated control system, the positions of the elements in the simulated control system, and the condition which governs the condition of each of the control elements; and
   B. printing out from the second computer a diagram of a simulated control circuit in accordance with said portion of the program transmitted to the second computer by the computer.

29. The method of performing Boolean logic comprising the steps of:
   A. providing in a computer a plurality of Boolean logical statements of fixed format the truth or falsity of the terms of which may be specified to be dependent in accordance with a logical function on the truth or falsity of a specified one of the logical statements;
   B. controlling the truth or falsity of certain of said logical statements each in accordance with the truth or falsity of a selected input bit to the computer;
   C. controlling the status of each of a plurality of output bits of the computer in accordance with the truth or falsity of a selected one of said logical statements;
   D. iteratively solving said logical statements; and
   E. changing the Boolean logical statements by
      a. specifying to the computer the logical statement which is to be controlled,
      b. specifying to the computer the logical statement which is to control, and
      c. specifying to the computer the term of the specified controlled logical statement which is to be controlled.

30. The method of performing Boolean logic as defined in claim 29 wherein the last named step is performed simultaneously with the previous steps.

31. The method of performing Boolean logic as defined in claim 29 and further defined in that a plurality of said logical statements; comprise the same number of terms and further comprising:
   A. dedicating a number of inputs of the computer each for specifying one of the terms of a logical statement, the number of inputs so dedicated being equal to the fixed number of terms in a logical statement.

32. The method of performing Boolean logic as defined in claim 29 and wherein the last named step comprises the additional step of:
   a. specifying the logical function governing the specified term which is to be controlled.

33. The method of performing Boolean logic as defined in claim 32 and further comprising:
   A. dedicating a number of inputs to the computer each for specifying one of the logical functions, the number of inputs so dedicated being equal to the selected number of logical functions.

34. The method of performing Boolean logic as defined in claim 32 wherein the last named step is performed simultaneously with previous steps.

35. A programming panel for a digital computer, the computer having stored therein an internal image of a control circuit in ladder diagram format, the ladder diagram format comprising a plurality of circuit lines having spaces, each space for the inclusion of one type of a plurality of types of logical functions, the programming panel comprising:
   A. a keyboard comprising individual keys, each key selecting one type of the plurality of types of a plurality of logical functions;
   B. means for selecting a circuit line of the ladder diagram format of the control circuit into which a logical function is to be placed;
   C. means for displaying the logical function type selected and the space in the selected circuit line into which it is to be placed; and,
   D. means for transmitting the selected information to the computer controller.

36. A programming panel for a digital computer controller as defined in claim 35 and further comprising:
   E. means for selecting a circuit line of the ladder diagram format of the control circuit, the condition of which is to control the selected logical function.

* * * * *

UNITED STATES PATENT OFFICE
CERTIFICATE OF CORRECTION

Patent No. 3,686,639     Dated August 22, 1972

Inventor(s) William E. Fletcher and Leon B. Rosseau

It is certified that error appears in the above-identified patent and that said Letters Patent are hereby corrected as shown below:

Col. 1, lines 54-58, the paragraph "While prior art...in any way." was deleted in Amendment B, filed January 17, 1972.
Col. 3, lines 7-10, paragraph "A further object...in programming." was deleted in Amendment B, filed January 17, 1972.
Col. 3, line 13, after "of" insert -- selectable --
Col. 5, line 47, after "relay", first occurrence, insert -- and the relay at the end of the circuit line is energized if the circuit line conducts --
Col. 5, line 47, after "relays" delete "and the relay at the end of the circuit line is energized if the circuit line conducts"
Col. 8, line 26, "A" should be "An"
Col. 8, line 53, "the", second occurrence, should be -- that --
Col. 10, line 45, after the second "L", insert -- Output --
Col. 10, line 67, delete the second "a"
Col. 11, line 5, "138" should be -- 128 --
Col. 11, line 21, "switch normally open" should read -- normally open switch --
Col. 13, line 8, "CB10" should be -- CR10 --
Col. 14, line 20, "FIG. 12A" should be -- FIG. 12a --
Col. 14, line 60, "determined" should be -- predetermined --
Col. 18, line 14, "Containing" should be -- containing --
Col. 19, line 22, "external" should be -- internal --
Col. 22, lines 50-51, delete "The contents of the function register are placed in the accumulator."
Col. 24, line 46, "subroutine" should be -- Subroutine --
Col. 28, line 26, after "inclusion" insert -- of --
Col. 32, line 6, delete ";"

Signed and sealed this 24th day of April 1973.

(SEAL)
Attest:

EDWARD M. FLETCHER, JR.
Attesting Officer

ROBERT GOTTSCHALK
Commissioner of Patents